(12) United States Patent
Kanai et al.

(10) Patent No.: US 12,723,991 B2
(45) Date of Patent: Sep. 1, 2026

(54) OPTICAL FOREIGN MATTER INSPECTION DEVICE

(71) Applicant: Hitachi High-Tech Corporation, Tokyo (JP)

(72) Inventors: Hisaaki Kanai, Tokyo (JP); Masami Makuuchi, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 158 days.

(21) Appl. No.: 18/267,137

(22) PCT Filed: Feb. 18, 2021

(86) PCT No.: PCT/JP2021/006207
§ 371 (c)(1),
(2) Date: Jun. 14, 2023

(87) PCT Pub. No.: WO2022/176133
PCT Pub. Date: Aug. 25, 2022

(65) Prior Publication Data
US 2024/0044806 A1 Feb. 8, 2024

(51) Int. Cl.
*G01N 21/94* (2006.01)
*G01N 21/39* (2006.01)
(Continued)

(52) U.S. Cl.
CPC ............. *G01N 21/94* (2013.01); *G01N 21/39* (2013.01); *G01N 21/47* (2013.01);
(Continued)

(58) Field of Classification Search
None
See application file for complete search history.

(56) References Cited

U.S. PATENT DOCUMENTS

2008/0000284 A1* 1/2008 Laue ........................ B01L 3/502 73/1.87
2015/0048256 A1* 2/2015 Matsumura .............. G11B 7/09 250/453.11

(Continued)

FOREIGN PATENT DOCUMENTS

JP 2000-338048 A 12/2000
JP 2009-124018 A 6/2009

(Continued)

OTHER PUBLICATIONS

International Search Report of PCT/JP2021/006207 dated Apr. 20, 2021.

*Primary Examiner* — Kara E. Geisel
*Assistant Examiner* — Chad Andrew Reverman
(74) *Attorney, Agent, or Firm* — MATTINGLY & MALUR, PC

(57) ABSTRACT

An optical foreign matter inspection device includes a rotation stage; a laser light source; a sensor that is a charge accumulation type sensor; a detecting circuit; a light emission timing signal generating circuit configured to generate a light emission timing synchronizing signal synchronized with laser emission; a trigger signal generating circuit configured to receive a first signal (a stage encoder signal) indicating a rotation state of a sample, and generate a trigger signal synchronized with the light emission timing synchronizing signal; a number-of-emitted-pulse calculating circuit configured to receive the light emission timing synchronizing signal and the first signal, and calculate the number of pulses in each period corresponding to a position in a radial direction of the sample; and a processing system configured to measure a state of each position on a surface of the sample by using a detection signal and the number of pulses.

8 Claims, 11 Drawing Sheets

(51) Int. Cl.
*G01N 21/47* (2006.01)
*G01N 21/95* (2006.01)

(52) U.S. Cl.
CPC ... *G01N 21/9501* (2013.01); *G01N 2021/392* (2013.01); *G01N 2021/4709* (2013.01); *G01N 2021/4735* (2013.01)

(56) References Cited

U.S. PATENT DOCUMENTS

| | | | | |
|---|---|---|---|---|
| 2016/0097727 | A1* | 4/2016 | Vazhaeparambil .......................... | G01N 21/8851 382/145 |
| 2017/0102339 | A1 | 4/2017 | Honda et al. | |
| 2018/0128592 | A1 | 5/2018 | Scott et al. | |
| 2019/0277772 | A1 | 9/2019 | Nishizawa et al. | |
| 2022/0003672 | A1* | 1/2022 | Saito ...................... | G01N 33/53 |
| 2022/0317058 | A1* | 10/2022 | Yamamoto ......... | G02B 21/0036 |
| 2022/0373479 | A1* | 11/2022 | Yamamoto .......... | H01L 21/6838 |

FOREIGN PATENT DOCUMENTS

| | | | | | |
|---|---|---|---|---|---|
| JP | 2009-262161 | A | | 11/2009 | |
| JP | 2013231631 | A | * | 11/2013 | ........... G01N 21/956 |
| JP | 2019-158401 | A | | 9/2019 | |

* cited by examiner

[FIG. 1]
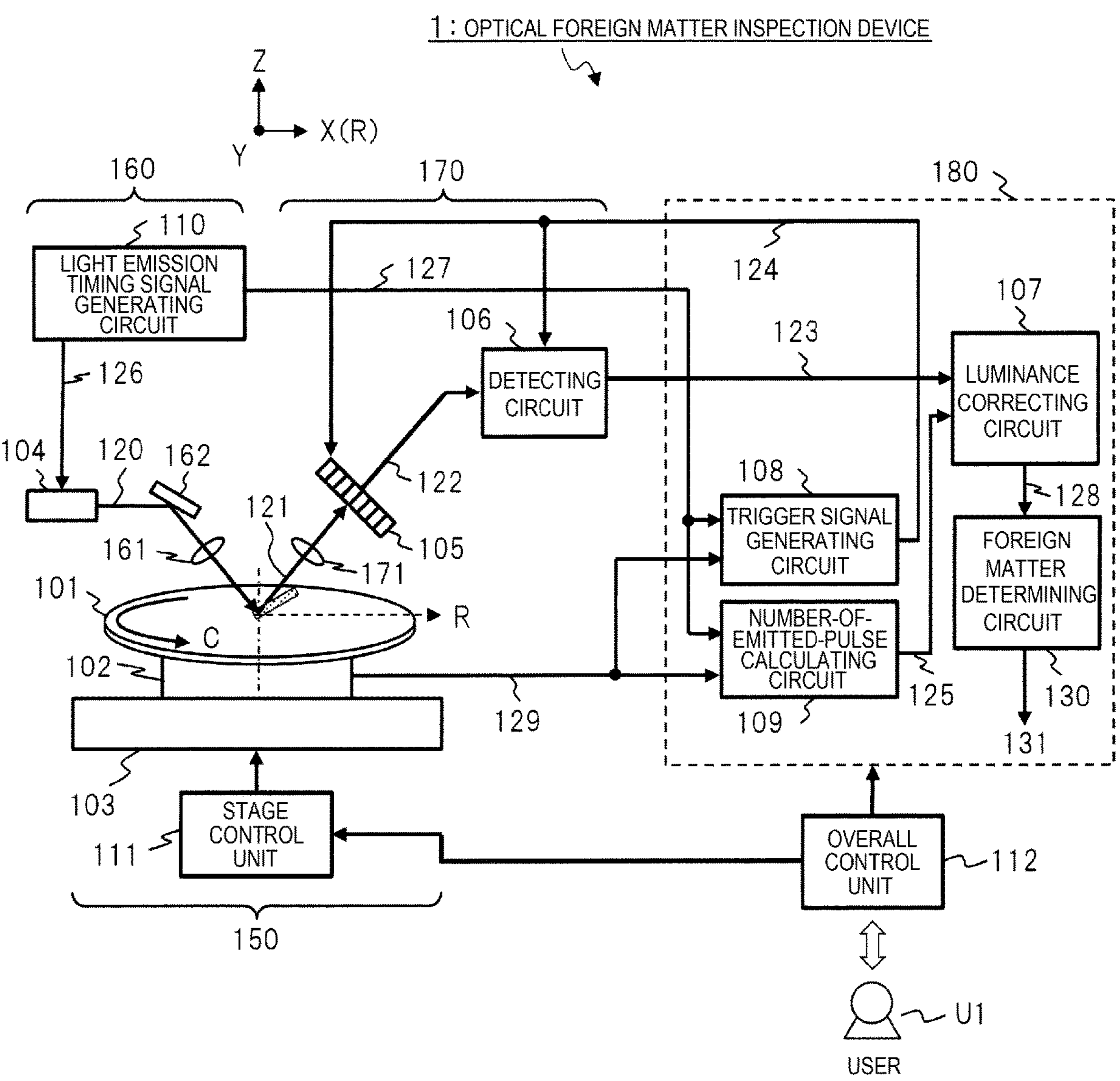

[FIG. 2]
( A )
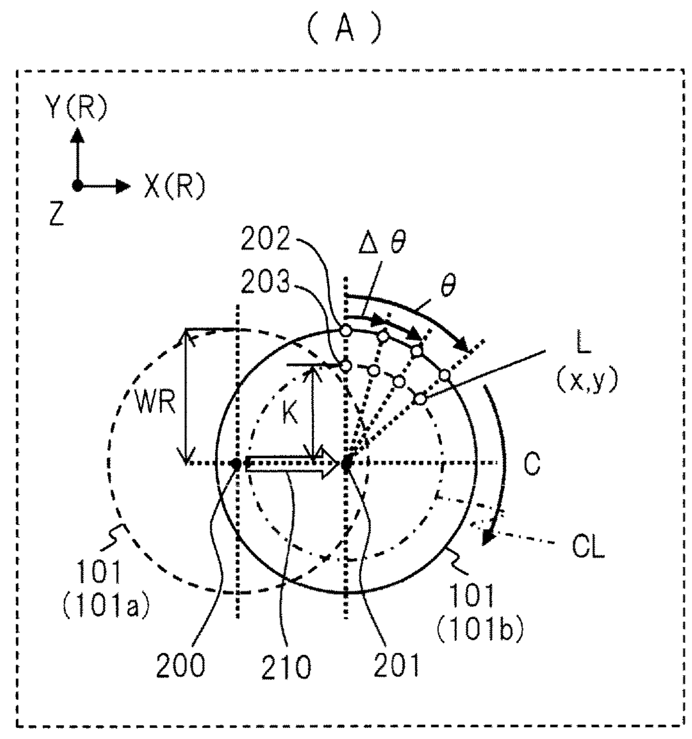
( B )
Y(R)
X(R)
Z
Δ θ
θ
220
p1
pm
L
(x,y)
K1
Km
C
101
(101b)
CL1
CLm
201

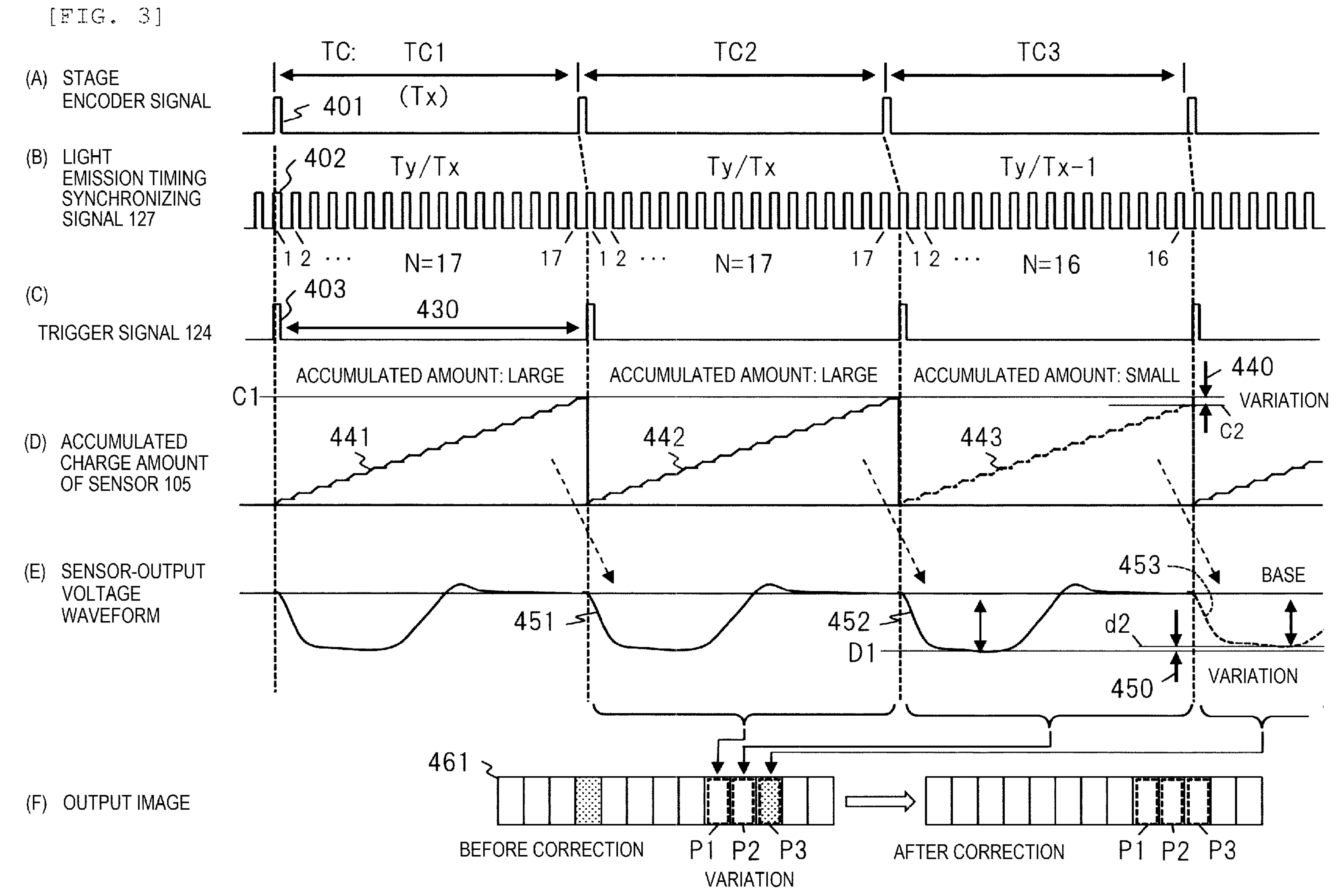
[FIG. 3]
(A) STAGE ENCODER SIGNAL
(B) LIGHT EMISSION TIMING SYNCHRONIZING SIGNAL 127
(C) TRIGGER SIGNAL 124
(D) ACCUMULATED CHARGE AMOUNT OF SENSOR 105
(E) SENSOR-OUTPUT VOLTAGE WAVEFORM
(F) OUTPUT IMAGE
TC:
TC1
(Tx)
TC2
TC3
401
402
403
430
Ty/Tx
Ty/Tx
Ty/Tx−1
1 2 ...
N=17
17
1 2 ...
N=17
17
1 2 ...
N=16
16
ACCUMULATED AMOUNT: LARGE
ACCUMULATED AMOUNT: LARGE
ACCUMULATED AMOUNT: SMALL
C1
440
VARIATION
C2
441
442
443
451
452
453
BASE
d2
D1
450
VARIATION
461
BEFORE CORRECTION
P1 P2 P3
VARIATION
AFTER CORRECTION
P1 P2 P3

[FIG. 4]
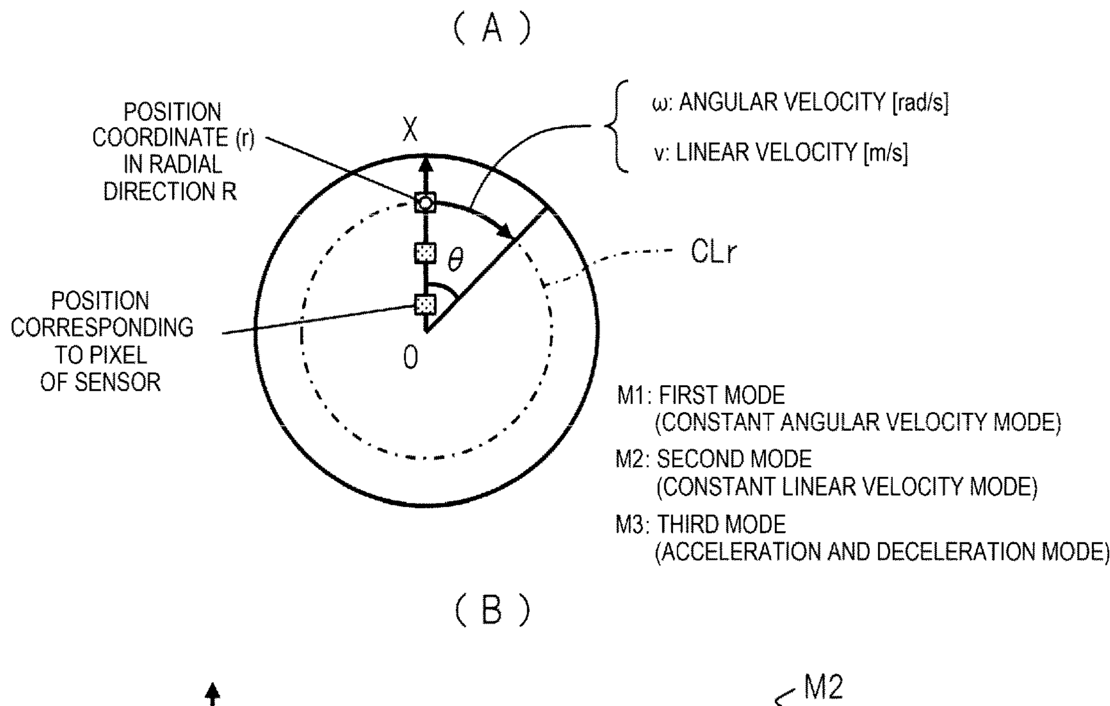
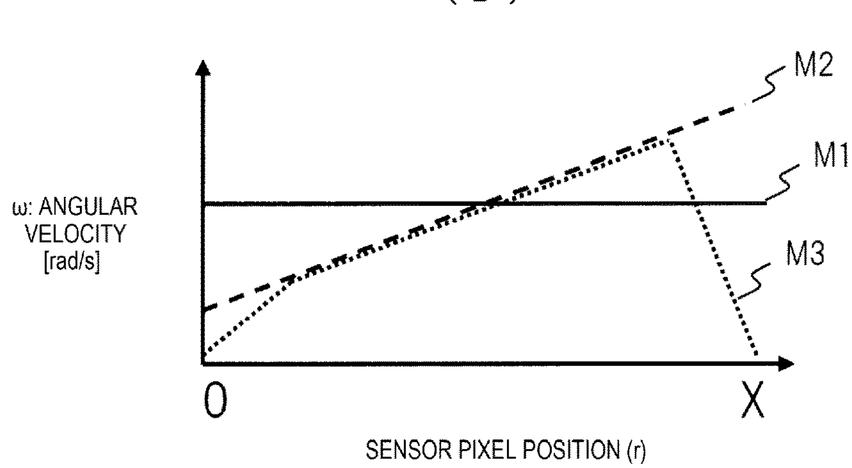
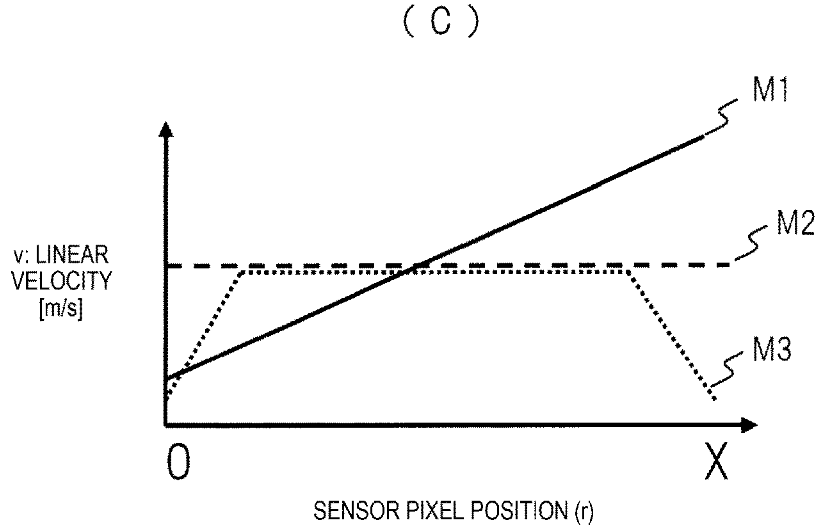

[FIG. 5]
S/N IN FIRST MODE
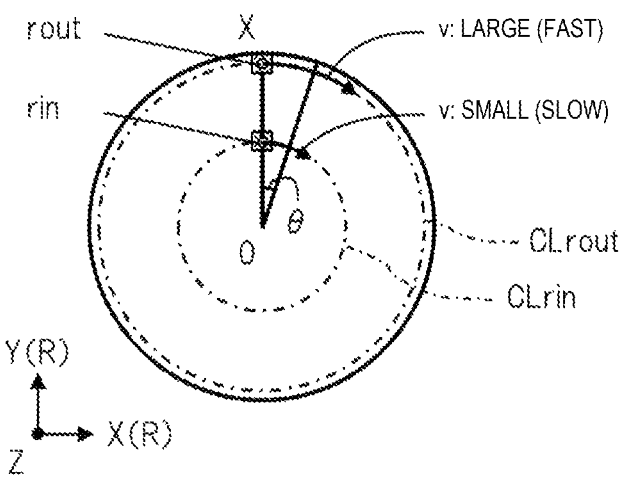
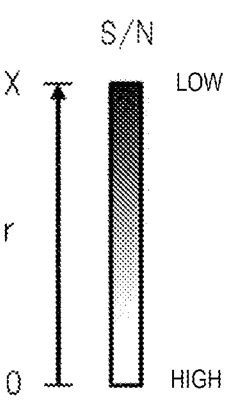

[FIG. 6]
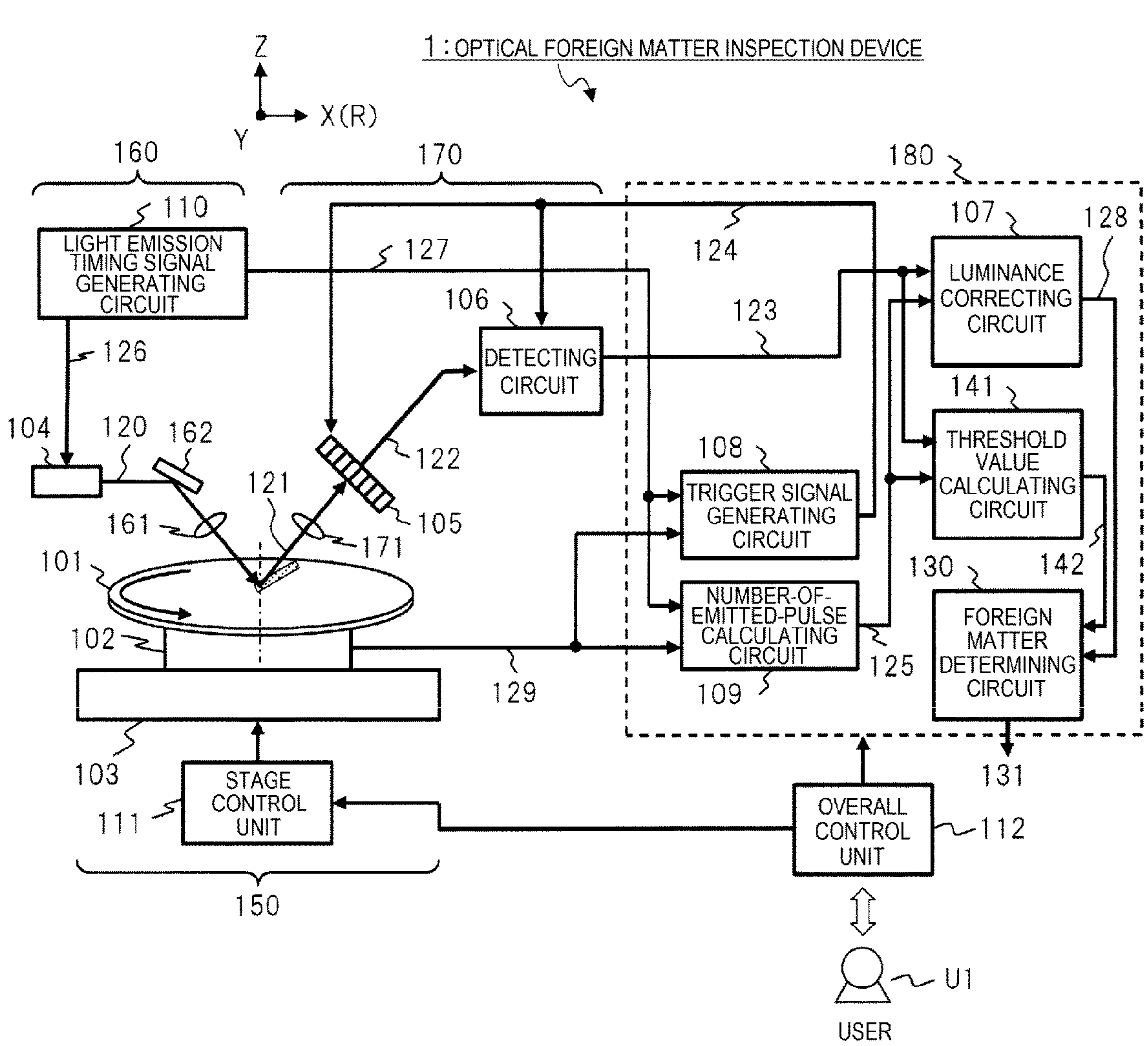

[FIG. 7]
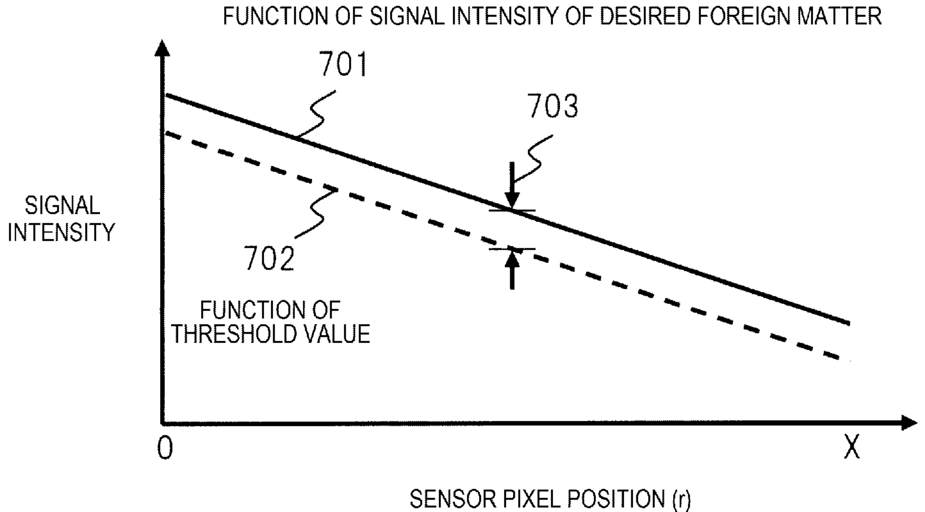
[FIG. 8]
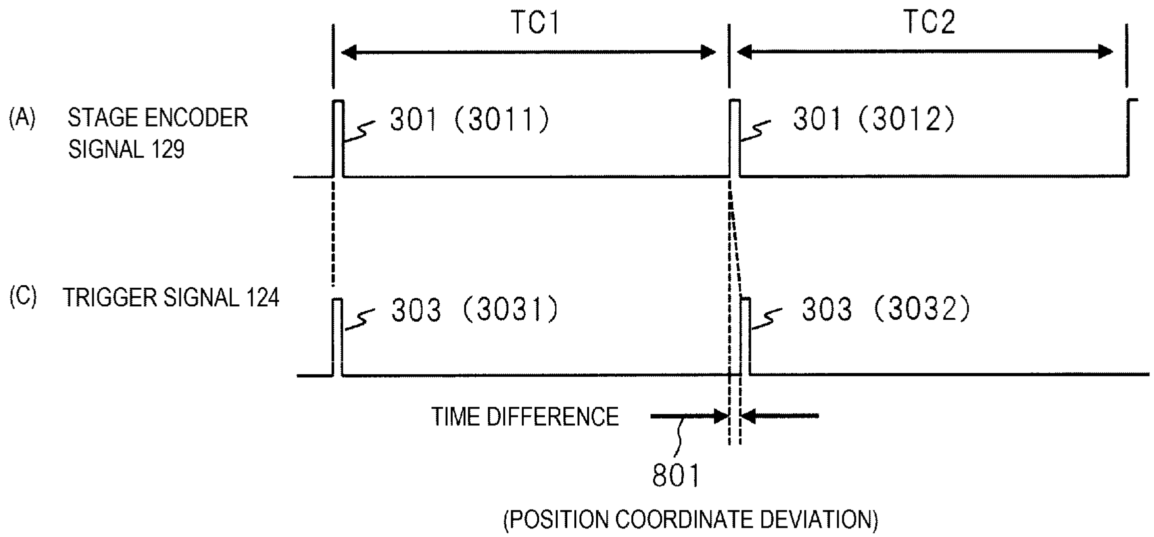

[FIG. 9]
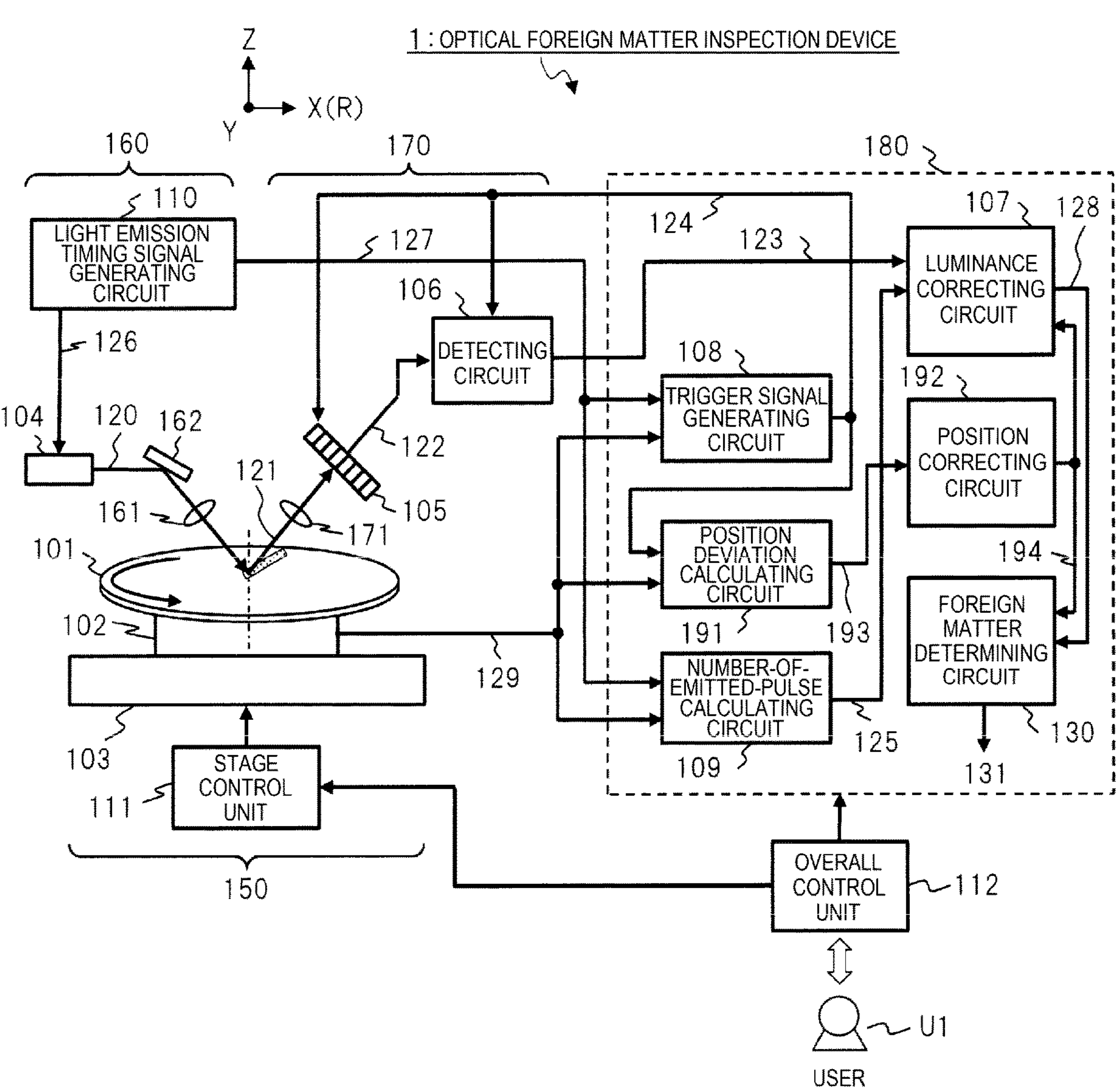

[FIG. 10]
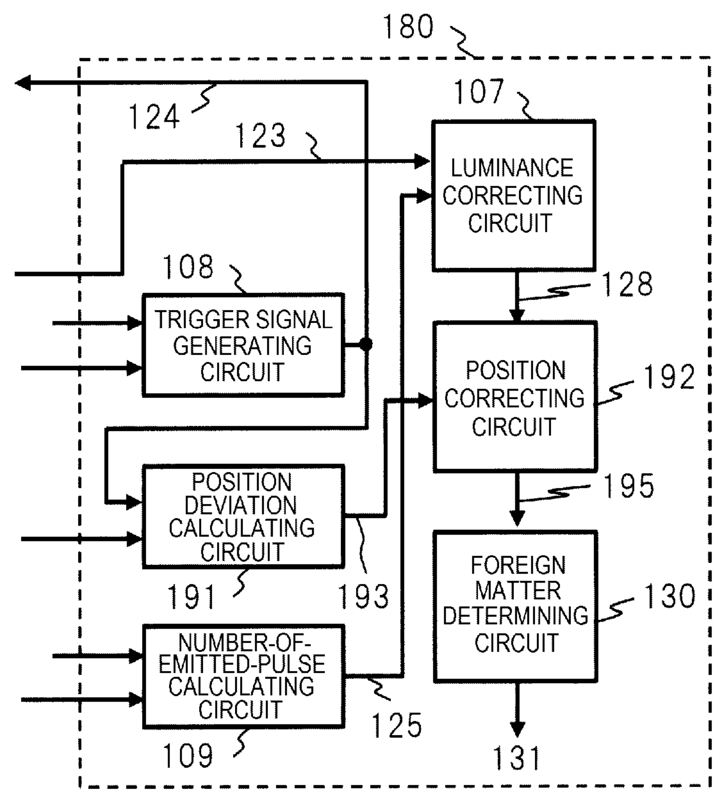

[FIG. 11]
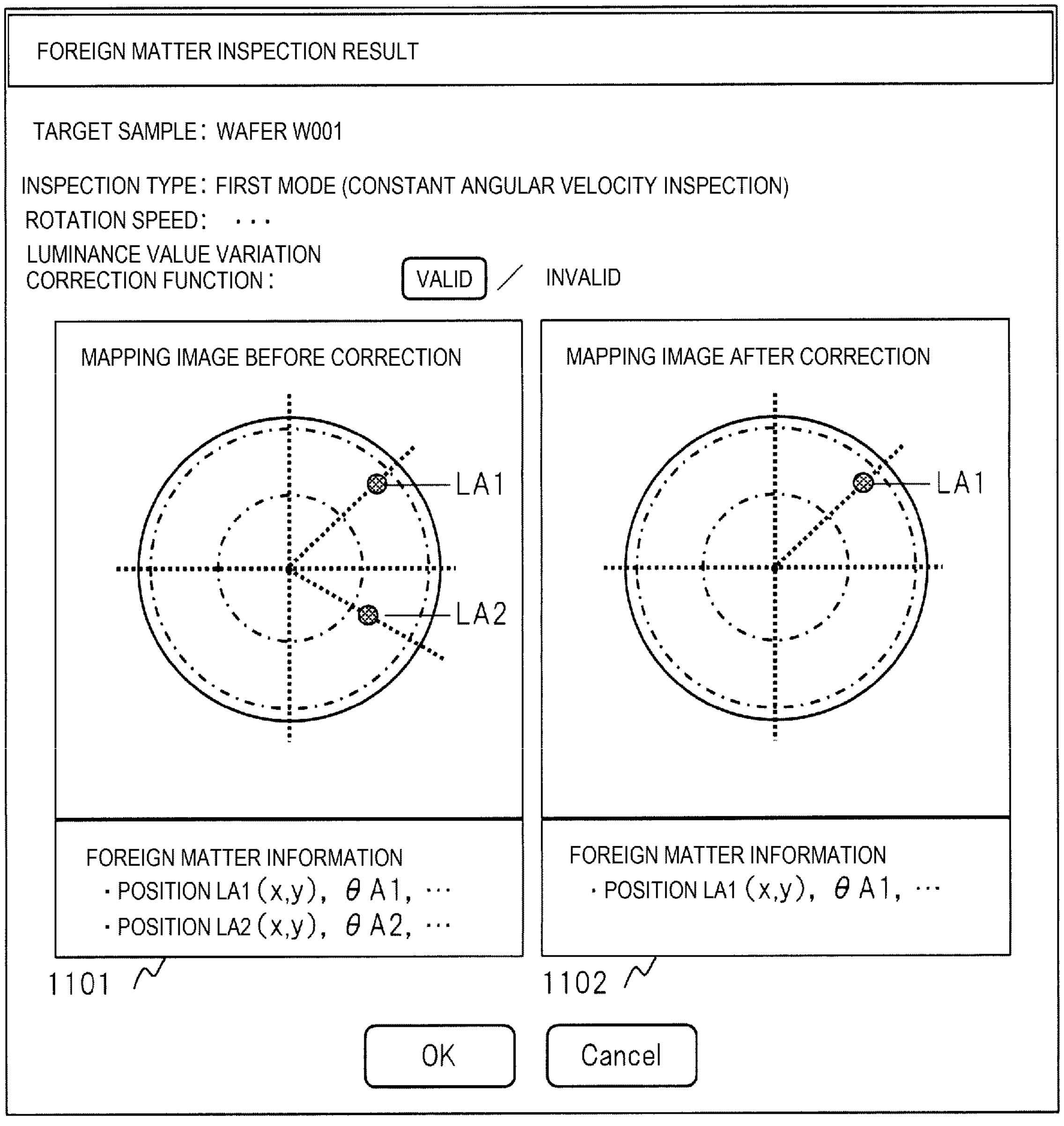

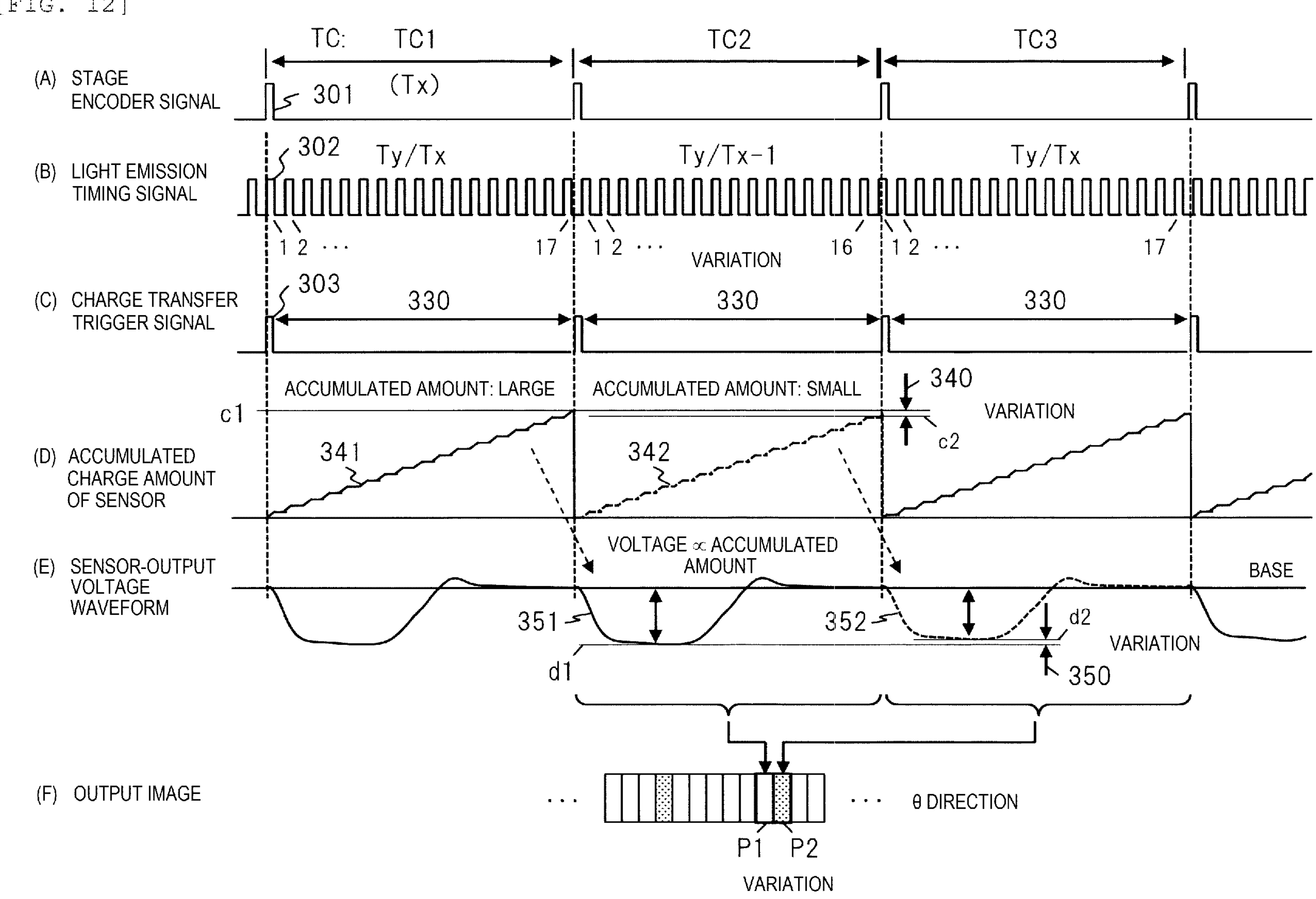
[FIG. 12]
(A) STAGE ENCODER SIGNAL
(B) LIGHT EMISSION TIMING SIGNAL
(C) CHARGE TRANSFER TRIGGER SIGNAL
(D) ACCUMULATED CHARGE AMOUNT OF SENSOR
(E) SENSOR-OUTPUT VOLTAGE WAVEFORM
(F) OUTPUT IMAGE
TC: TC1 (Tx)
TC2
TC3
301
302
303
Ty/Tx
Ty/Tx-1
Ty/Tx
1 2 ...
17
16
VARIATION
330
ACCUMULATED AMOUNT: LARGE
ACCUMULATED AMOUNT: SMALL
340
c1
c2
341
342
VOLTAGE ∝ ACCUMULATED AMOUNT
BASE
351
352
d1
d2
350
θ DIRECTION
P1
P2

OPTICAL FOREIGN MATTER INSPECTION DEVICE

TECHNICAL FIELD

The present invention relates to a technique of an optical foreign matter inspection device that performs observation, inspection, and the like on a semiconductor device or the like.

BACKGROUND ART

The optical foreign matter inspection device irradiates a sample such as a semiconductor wafer with, for example, laser light, detects scattered light by a sensor, and determines and detects a foreign matter, a defect, or the like (hereinafter, collectively referred to as the foreign matter) on a sample surface based on a detection signal.

Related-art examples related to the optical foreign matter inspection device include JP2000-338048A (PTL 1). PTL 1 discloses, as a surface inspection method or the like, a technique of irradiating an inspection position on a semiconductor wafer with pulsed light from a pulse laser, detecting scattered light by a photodetector having a detection gate function, controlling an emission timing and a detection timing of irradiation light by a timing synchronization unit, and turning on a detection gate in accordance with an arrival timing of the scattered light to the photodetector so as to reduce an influence of background light caused by the detection of noise light and significantly improve an S/N ratio.

CITATION LIST

Patent Literature

PTL 1: JP2000-338048A

SUMMARY OF INVENTION

Technical Problem

In the optical foreign matter inspection device, an example of a method and a configuration for improving a detection sensitivity and an inspection accuracy includes a method and a configuration in which a pulse laser is applied as a laser light source, and a charge accumulation type sensor such as a CMOS sensor or a CCD sensor is applied as a sensor for detecting the scattered light. The pulse laser is a laser light source of a type (a pulse laser type) capable of providing high-power density output and outputting periodic pulsed laser light of, for example, about several tens MHz to several hundreds MHz. The charge accumulation type sensor such as a CMOS sensor or a CCD sensor is a sensor having high sensitivity and multiple pixels, and is a sensor in which imaging elements associated with the pixels are one-dimensionally or two-dimensionally arranged. Each of the imaging elements is implemented by a photodiode or the like that can capture the scattered light and convert the scattered light into charges. The charge accumulation type sensor accumulates the charges generated by the photodiodes at a timing of a trigger signal, and outputs an electric signal corresponding to an amount of the accumulated charges. In other words, the trigger signal is a charge transfer trigger signal that defines a timing for the accumulation and transfer of the charges in the sensor.

In an optical foreign matter inspection device as a related-art example, the charge accumulation type sensor performs the accumulation and transfer of the charges as described above by using the charge transfer trigger signal synchronized with a stage encoder signal. The stage encoder signal is a signal representing a rotation state (for example, a position, a displacement, an angle, a speed, or the like) of a rotation stage on which the sample is placed.

However, in the related art, the charge transfer trigger signal based on the stage encoder signal is not synchronous with a light emission period of the pulse laser (in other words, the light emission timing signal). The light emission period of the pulse laser corresponds to a pulse of the light emission timing signal provided to the laser light source. In the related art, the synchronization of these signals has not been taken into consideration. The non-synchronization occurs due to a factor such as a variation in an oscillation frequency, or a non-coherent sample.

Due to the non-synchronization, the accumulated-charge amount (in other words, an output signal in each period) of the charge accumulation type sensor may vary such that the accumulated-charge amount increases or decreases within a range of one pulse of the laser at the maximum, for example. When there is the variation, the variation appears as a variation in a luminance value of each pixel corresponding to each position on the sample surface, in a voltage waveform of the output signal of the sensor and sampling data (in other words, a digital detection signal) of the detecting circuit based on the voltage waveform. As a result, the accuracy of measurement on the sample surface, the foreign matter determination, and the like may be reduced.

An object of the invention relates to a technique of an optical foreign matter inspection device, and is to provide a technique capable of reducing or eliminating a variation in a detection signal at each position on a sample surface, and achieving a high-accuracy inspection and the like.

Solution to Problem

A representative embodiment of the invention has the following configuration. An optical foreign matter inspection device according to an embodiment is an optical foreign matter inspection device for inspecting a foreign matter on a surface of a sample, the optical foreign matter inspection device includes: a rotation stage allowing the sample to be placed thereon and configured to be rotationally driven; a laser light source configured to irradiate the surface of the sample with a pulsed laser; a charge accumulation type sensor configured to detect light scattered or reflected from the surface of the sample; a detecting circuit configured to perform analog-digital conversion on and detect an output signal of the charge accumulation type sensor; a light emission timing signal generating circuit configured to generate a light emission timing synchronizing signal that is synchronized with a light emission timing signal for the pulsed laser of the laser light source; a trigger signal generating circuit configured to receive the light emission timing synchronizing signal and a first signal indicating or capable of specifying a rotation state of the sample on the rotation stage, generate a trigger signal for controlling a timing for charge accumulation in the charge accumulation type sensor and a timing for detection by the detecting circuit, the trigger signal being synchronized with the light emission timing synchronizing signal, and provide the trigger signal to the charge accumulation type sensor and the detecting circuit; a number-of-emitted-pulse calculating circuit configured to receive the light emission timing synchronizing signal and the first signal, and calculate the number of pulses in each period, that is synchronized with the light emission timing synchronizing signal, on a circumferential line on the sample corresponding to a position in a radial direction of the sample and a pixel of the charge accumulation type sensor; and a processing system configured to measure a state of each position, associated with the rotation, on the circumferential line on the surface of the sample by using the detection signal and the number of pulses.

Advantageous Effects of Invention

According to the representative embodiment of the invention, a technique of an optical foreign matter inspection device is provided which can reduce or eliminate a variation in a detection signal at each position on a sample surface, and can achieve a high-accuracy inspection, and the like. Problems, configurations, and effects in addition to the above will be described in the column [Description of Embodiments].

BRIEF DESCRIPTION OF DRAWINGS

FIG. 1 illustrates a configuration of an optical foreign matter inspection device according to Embodiment 1 of the invention.

FIG. 2 illustrates rotation and translation of a stage and a sample, and a configuration example of a line sensor in Embodiment 1.

FIG. 3 illustrates an example of each signal for describing elimination of a variation in Embodiment 1.

FIG. 4 is a diagram illustrating a first mode, a second mode, and a third mode as inspection modes in Embodiment 1.

FIG. 5 illustrates an outline image of S/N in a first mode in Embodiment 2.

FIG. 6 illustrates a configuration of an optical foreign matter inspection device according to Embodiment 2.

FIG. 7 illustrates an example of a foreign matter determination threshold value in Embodiment 2.

FIG. 8 is a diagram illustrating an example of a position coordinate deviation in Embodiment 3.

FIG. 9 illustrates a configuration of an optical foreign matter inspection device according to Embodiment 3.

FIG. 10 illustrates a configuration of a processing system according to a modification of Embodiment 3.

FIG. 11 illustrates an example of a display screen for a foreign matter inspection result that is applicable in each embodiment.

FIG. 12 illustrates an example of each signal for describing problems and the like in a comparative example with respect to Embodiment 1.

DESCRIPTION OF EMBODIMENTS

Hereinafter, embodiments of the invention will be described in detail with reference to the drawings. In the drawings, the same parts are denoted by the same reference numerals in principle, and a repeated description thereof will be omitted. In order to facilitate understanding of the invention, in the drawings, representations of respective components may not actually represent a position, a size, a shape, a range, and the like, and the invention is not necessarily limited to the position, the size, the shape, the range, and the like disclosed in the drawings.

For the purpose of description, when processing performed by a program is described, the description may be made with a program, a function, or a processing unit as a main object. However, the main object which is hardware regarding the program, the function, or the processing unit is a processor, or a controller, an apparatus, a computer, a system, or the like including the processor and the like. The computer performs processing according to a program read onto a memory while appropriately using resources such as a memory and a communication interface by the processor. Accordingly, predetermined functions, processing units, and the like are achieved. The processor is implemented by, for example, a semiconductor device such as a CPU or a GPU. The processor is implemented by a device or a circuit capable of performing a predetermined calculation. The processing is not limited to software program processing, and can be performed by a dedicated circuit. An FPGA, an ASIC and the like can be applied as the dedicated circuit. The program may be installed as data in a target computer in advance, or may be distributed and installed as data into the target computer from a program source. The program source may be a program distribution server on a communication network, and may be a non-transient computer-readable storage medium. The program may include a plurality of program modules. A computer system is not limited to one device, and may include a plurality of devices. The computer system may be implemented by a client server system, a cloud computing system, an IoT system, or the like. Structures and forms of various types of data and information are not particularly limited. Expressions such as identification information, an identifier, an ID, a name, a number, or the like can be replaced with each other.

Embodiment 1

An optical foreign matter inspection device according to Embodiment 1 of the invention will be described with reference to FIGS. 1 to 4 and the like. The optical foreign matter inspection device according to Embodiment 1 has a function of correcting a variation in luminance of a pixel at each position on a sample surface in a detection signal, and the variation is caused by the fact that the charge transfer trigger signal based on the stage encoder signal is asynchronous with the light emission period of the pulse laser, which is described above.

[Optical Foreign Matter Inspection Device (1-1)]

FIG. 1 illustrates a configuration of an optical foreign matter inspection device 1 according to Embodiment 1. The optical foreign matter inspection device 1 according to Embodiment 1 includes an overall control unit 112, a stage 150, an irradiation optical system 160, a detection optical system 170, a processing system 180, and the like. The overall control unit 112 controls the entire optical foreign matter inspection device 1 and parts thereof. The overall control unit 112 can be implemented by a computer system or a dedicated circuit. A user U1 is a person who operates and uses the optical foreign matter inspection device 1, inputs an instruction or a setting, confirms information, and the like with respect to the overall control unit 112 via an input device or an output device. The processing system 180 or the overall control unit 112 also provides a graphical user interface (GUI) to the user U1 via the output device. In the description, (X, Y, Z), (R, C), and the like may be used to represent a direction and a coordinate system. A Z direction is a vertical direction, a height direction, and a thickness direction. X and Y directions are two orthogonal directions forming a horizontal plane, and correspond to a radial direction R of the stage 150 or a sample 101.

The stage 150 includes a rotation stage 102, a translation stage 103, a stage control unit 111, and the like. A wafer serving as the sample 101 is placed and held on the rotation stage 102. The rotation stage 102 rotates in a circumferential direction C around the shown Z direction as a rotation axis. The translation stage 103 is translated in a direction of the horizontal plane formed by the shown X and Y directions. The stage control unit 111 drives and moves the rotation stage 102 and the translation stage 103 under drive control of the overall control unit 112. The stage control unit 111 can be implemented by a computer system or a dedicated circuit. By drive control on the stage 150, it is possible to align a target position on a surface of the sample 101 with an irradiation position of a laser 120 from a laser light source 104. In Embodiment 1, the stage 150 is a mechanism capable of rotating and translating, but the invention is not limited thereto. The translation function of the stage 150 is not essential.

The irradiation optical system 160 includes a light emission timing signal generating circuit 110, a pulse laser serving as the laser light source 104, a mirror 162, a lens 161, and the like. The light emission timing signal generating circuit 110 generates a light emission timing signal 126 based on the control of the overall control unit 112, and provides the light emission timing signal 126 to the laser light source 104. The light emission timing signal 126 is a signal that defines a light emission timing of the pulsed laser 120 from the laser light source 104. The laser light source 104 outputs the pulsed laser 120 (in other words, a laser beam or laser light) in response to the light emission timing signal 126. The laser 120 is reflected by the mirror 162, condensed by the lens 161 to form an image, and emitted onto a target location on the surface of the sample 101 on the rotation stage 102. Due to the irradiation with the laser 120, scattered light 121 is generated from the target location of the surface of the sample 101.

The detection optical system 170 includes a lens 171, a sensor 105, a detecting circuit 106, and the like. The scattered light 121 is condensed by the lens 171 to form an image, and is incident on imaging elements of the sensor 105. The sensor 105 is a charge accumulation type sensor that detects a light intensity or the like of the scattered light 121 from the surface of the sample 101 by using the imaging elements, and outputs the light intensity or the like as an analog output signal 122. The sensor 105 is implemented by, for example, a CMOS sensor or a CCD sensor. The sensor 105 has an arrangement of the imaging elements each of which is implemented by a photodiode or the like, and is a line sensor ((B) of FIG. 2) to be described later in Embodiment 1. The line sensor includes a plurality of imaging elements arranged at least in a one-dimensional direction. The sensor 105 converts the incident light that is the scattered light 121 into charges by the imaging elements, accumulates the charges, and generates the output signal 122 based on an amount of the accumulated charges. The output signal 122 has a value of an electric signal corresponding to the light intensity or the like for each of pixels corresponding to the imaging elements. In Embodiment 1, the sensor 105 accumulates and transfers the charges at a timing synchronized with a received trigger signal 124 (FIG. 3 to be described later).

The detecting circuit 106 samples the output signal 122 from the sensor 105 by performing analog-digital conversion, performs predetermined signal processing, and provides the obtained signal as a digital detection signal 123 (in other words, sampling data) to a luminance correcting circuit 107. In Embodiment 1, the detecting circuit 106 performs the sampling at a timing synchronized with the received trigger signal 124. The detection signal 123 includes digital pixel information corresponding to the imaging elements forming the arrangement in the sensor 105. Examples of data processing and signal processing performed by the detecting circuit 105 include calculation or averaging, filter processing, and the like on a signal intensity of a signal for each pixel. The detection signal 123 includes, as time series data, pixels associated with the positions on the surface of the sample 101, and has, as pixel values, luminance values associated with, for example, the light intensities or the like.

The processing system 180 includes a trigger signal generating circuit 108, a number-of-emitted-pulse calculating circuit 109, the luminance correcting circuit 107, a foreign matter determining circuit 130, and the like. The processing system 180 and each of the parts thereof can be implemented by computer systems or dedicated circuits. For example, each of the parts such as the detecting circuit 106, the trigger signal generating circuit 108, the number-of-emitted-pulse calculating circuit 109, and the luminance correcting circuit 107 is implemented by a dedicated circuit such as an FPGA. It is possible to perform high-speed processing when each of the parts is implemented as a dedicated circuit. Further, for example, the foreign matter determining circuit 130 or the overall control unit 112 is implemented by a computer system, and achieves a function based on software program processing. The implementation example is not limited thereto. The processing system 180 may be collectively implemented as a computer system, or each of the parts thereof may be implemented as a computer system.

The computer system can include, for example, a computer, an input device, an output device and an external storage device that are connected to the computer. The computer includes a processor, a memory, a communication interface, an input and output interface, a bus, and the like. Each of the processor and the memory includes, for example, a CPU, a ROM, a RAM, a nonvolatile storage device, and the like. The processor achieves functions by executing the software program processing based on data and a program in the memory. Examples of the input device include a keyboard and a mouse, and examples of the output device includes a display device. The input device and the output device may be provided in the computer system. In addition, the computer system may be connected to an external device such as an external communication network or a server via the communication interface to read and write data from and to the external device. Examples of the external device include another inspection device, a device that manages information on the sample 101, a manufacturing process, and the like.

The processing system 180 or the overall control unit 112 can display the detection signal 123, luminance correction information 128, radius information, sample information, inspection information, foreign matter determination result information 131, and the like on a screen together with the GUI. As an example, a position coordinate of the foreign matter or the like on the surface of the sample 101 can be generated and output as a mapping image. The output is, for example, displaying on a display screen of a display device provided in or connected to the processing system 180 or the overall control unit 112. The radius information is information indicating a position in the radial direction R in FIG. 2, and information corresponding to the radius information can be acquired from the stage 150 or the stage control unit 111 or the overall control unit 112.

The overall control unit 112 includes inspection information on a rotation inspection of the sample 101, and provides the inspection information to each part as necessary. The inspection information includes information such as modes for the rotation inspection (to be described later) and a rotation speed, a rotation direction, and the like of the rotation stage 102.

The user U1 may use functions of the optical foreign matter inspection device 1 by accessing the computer system of the optical foreign matter inspection device 1 from a client terminal device. For example, the client terminal device of the user U1 accesses the computer system (for example, the overall control unit 112 or the processing system 180) of the optical foreign matter inspection device 1, acquires screen data including the GUI from the computer system, and displays the screen data on the display screen. The user U1 inputs information on an instruction or a setting to the screen including the GUI, and the client terminal device transmits the information to the computer system. The computer system controls an operation relating to a foreign matter inspection based on the information from the client terminal device, and transmits inspection result information and the screen data including the GUI to the client terminal device. The client terminal device can display the screen, and the user U1 can perform confirmation or the like by viewing the screen.

[Optical Foreign Matter Inspection Device (1-2)]

In FIG. 1, in the case of the related art, the light emission timing signal generating circuit 110 is a circuit that provides, to the laser light source 104, the light emission timing signal 126 that defines the light emission timing of the pulsed laser 120 from the laser light source 104. Further, in Embodiment 1, the light emission timing signal generating circuit 110 generates a light emission timing synchronizing signal 127 that is a signal synchronized with the light emission timing signal 126, and provides the light emission timing synchronizing signal 127 to the trigger signal generating circuit 108 and the number-of-emitted-pulse calculating circuit 109 of the processing system 180. In other words, providing the signal means, for example, transmitting a signal to a target part through a signal line. Although the light emission timing synchronizing signal 127 is separately described, the light emission timing synchronizing signal 127 may be the same as the light emission timing signal 126.

The trigger signal generating circuit 108 generates the trigger signal 124 for timing control on the sensor 105 and the detecting circuit 106, which is synchronized with the light emission timing synchronizing signal 127, and provides the trigger signal 124 to the sensor 105 and the detecting circuit 106. The trigger signal 124 substantially corresponds to a charge transfer trigger signal (a signal synchronized with the stage encoder signal) in an example of a related-art technique (FIG. 12 to be described later), but in Embodiment 1, as a difference, the trigger signal 124 is a signal that is generated to be synchronized with the light emission timing synchronizing signal 127 (FIG. 3 to be described later).

A stage encoder signal 129 is a signal representing the rotation state (a position or a displacement, an angle, and the like) of the rotation stage 102 and the sample 101, and is a pulse signal that is generated according to the rotation speed, a rotation angle, and the like of the rotation stage 102, as illustrated in (A) of FIG. 3 to be described later. The rotation speed can also be represented by the number of pulses per unit time. As illustrated in FIG. 2, each time the rotation stage 102 rotates at a unit rotation angle $\Delta\theta$ (illustrated as a relatively large angle for description), one pulse of the stage encoder signal 129 is generated. The trigger signal generating circuit 108 and the like can acquire or calculate, based on the stage encoder signal 129, a position or a displacement of the rotation on a circumferential line CL in FIG. 2, a value of a rotation angle $\theta$, and the like, as information indicating the rotation state of the rotation stage 102. As a specific example, by counting the number of pulses 401 based on the stage encoder signal 129 shown in (A) of FIG. 3, the rotation angle $\theta$ and the like on the surface of the sample 101 can be calculated. Based on the rotation angle $\theta$, a position on the surface of the sample 101 (a position L and a position coordinate (x, y) in FIG. 2) can also be obtained by conversion.

As a modification, it is also possible to acquire the information indicating the rotation state of the rotation stage 102 from the stage control unit 111, the overall control unit 112, or the like. The trigger signal generating circuit 108 and the like may refer to other information, rather than the stage encoding signal 129, through which the rotation state (the position or the displacement, the angle, and the like) of the rotation stage 102 can be specified and calculated. However, from the viewpoint of time, it is more accurate and preferable to acquire the information indicating the rotation state by directly referring to the stage encoding signal 129 from the rotation stage 102 as in Embodiment 1.

Based on the stage encoder signal 129 obtained from the rotation stage 102 and the light emission timing synchronizing signal 127, the number-of-emitted-pulse calculating circuit 109 calculates the number of times of pulse emission (the number of pulses N) of the pulsed laser 120 at each pixel at each position and in each corresponding period during scanning of the circumferential line corresponding to the position in the radial direction R on the surface of the sample 101 (FIG. 3 to be described later). The number-of-emitted-pulse calculating circuit 109 provides number-of-emitted-pulse information 125, which is information including the calculated number of pulses N in each position, each pixel, and each period, to the luminance correcting circuit 107.

The luminance correcting circuit 107 receives the detection signal 123 that is the sampling data, and the number-of-emitted-pulse information 125, and corrects a luminance value for the pixel at each position in the detection signal 123 so as to eliminate the variation described above. The luminance correcting circuit 107 stores and outputs the luminance correction information 128 (in other words, image data after the correction) as a result after the correction. According to the correction in the luminance correcting circuit 107, as a basic effect, luminance information on each position in which the variation is eliminated is obtained as the luminance correction information 128. The luminance correction information 128 can be freely used.

As an output of the luminance correction information 128, a result after the correction is displayed as a measurement result to the user U1 via the display screen of the output device. Each of the detection signal 123 before the correction and the luminance correction information 128 after the correction can also be generated, for example, as an image (also referred to as the mapping image) visualized by associating a luminance value with each position coordinate on a region corresponding to the surface of the sample 101.

In Embodiment 1, the luminance correcting circuit 107 further provides the luminance correction information 128 to the foreign matter determining circuit 130. The foreign matter determining circuit 130 performs foreign matter determination processing by using the luminance correction information 128, and stores and outputs the foreign matter determination result information 131. Note that the foreign matter determining circuit 130 is not essential. The foreign matter determining circuit 130 performs processing of using the luminance correction information 128 to determine the presence or absence of a foreign matter at each position on the surface of the sample 101 according to a predetermined foreign matter determination method, and storing and outputting the foreign matter determination result information 131. The predetermined foreign matter determination method is not particularly limited, but as an example of a known method, a method of comparing the luminance value of the pixel at each position with a predetermined threshold value and determining that there is a foreign matter when the luminance value exceeds the threshold value can be applied. The predetermined threshold value can be set in advance. The processing system 180 or the overall control unit 112 generates the mapping image based on the foreign matter determination result information 131 and displays the mapping image on the display screen of the display device. The user U1 can view and confirm a foreign matter determination result, in other words, an inspection result in the form of a mapping image on the display screen.

In the drawings, an example in which signals are transmitted between the parts of the processing system 180 and the like through signal lines is indicated by arrows, but the example is illustrated in a minimum level, and the invention is not limited thereto. For example, a buffer circuit, a memory, or the like that temporarily stores signals and data may be provided between the parts, and other control information may be exchanged between the parts. In such an optical foreign matter inspection device, a transmission timing of each of the signals between the parts and a real-time property are important, and the illustrated configuration is appropriately designed in consideration of a delay of the signals between the parts in order to eliminate the variation indicated as a problem.

[Stage, Sample Surface, and Sensor]

FIG. 2 is a diagram illustrating the surface of the sample 101 on the stage 150, the circumferential line CL that is a target for rotation, translation and inspection, the line sensor, and the like.

(A) of FIG. 2 illustrates a basic configuration relating to the translation and rotation in an X-Y plane of the sample 101 on the rotation stage 102. First, the sample 101 (101*a*) before translational movement whose outer shape is indicated by a broken line is disposed at a reference position 200. Here, the reference position 200 is a central point of a circular shape of a semiconductor wafer. The sample 101*a* is translation-moved 210, for example, to a right side in an X direction by the translation stage 103. Accordingly, a state of the sample 101 (101*b*) after the translational movement whose outer shape is indicated by a solid line is obtained. The sample 101*b* is disposed at a reference position 201. In the sample 101*b*, for example, a position 202 or a position 203 is an example of the position in the radial direction R, and is an example of the reference position for the rotation in a circumference (described as the circumferential line CL) corresponding to the position. For example, the rotation performed by the rotation stage 102 is performed from the position 203 away from the central point by a distance K in the radial direction R with the circumferential direction C, which is a clockwise direction in FIG. 2, as an inspection direction. The rotation angle θ is an angle corresponding to rotation movement.

The irradiation position of the laser 120 is fixed to a certain position (for example, the position 203). By performing the translational movement in a Y direction by the translation stage 103, a position in the radial direction R which is irradiated with the beam 120 can be changed as in the example of the position 203. Accompanying the rotation of the sample 101*b*, different positions in the circumferential direction C on the sample 101*b* are irradiated with the laser 120 sequentially in time series. The irradiation position at each time point in a case of rotating in the circumferential direction C from the position 203 is indicated as the position L and the position coordinate (x, y). Although the irradiation position is illustrated to move in the circumferential direction C in FIG. 2, the irradiation position is actually fixed and a plurality of positions on the circumference are irradiated due to the rotation of the sample 101.

Similar to (A) of FIG. 2, (B) of FIG. 2 illustrates an arrangement example of detection target positions (corresponding pixels) of the line sensor that is the sensor 105, with respect to the irradiation position of the laser 120 in the X-Y plane of the sample 101. An illustrated line region 220 is a region in which a plurality of positions (for example, p1 to pm) are simultaneously detected and imaged in the radial direction R. The sensor 105 is a line sensor in which a plurality of imaging elements are arranged corresponding to the line region 220. For example, the position p1 is a position that is away from the central point (the reference position 201) by a distance K1, and the position pm is a position that is away from the central point by a distance Km. A plurality of positions in the line region 220 may be simultaneously irradiated with the laser 120 from the laser light source 104, or any position may be irradiated.

The sensor 105 in FIG. 1, which is a line sensor, is arranged corresponding to a direction and a position at which the scattered light 121 is generated from the line region 220. Under translation and rotation control on the stage 150, the line region 220 on the surface of the sample 101, that is, an inspection target position can be changed. When such a line sensor is used, a plurality of the circumferential lines CL corresponding to the plurality of positions in the radial direction R in the line region 220 can be simultaneously measured and inspected. That is, the efficiency of the inspection can be improved by using such a line sensor. When attention is paid to a pixel at one position in the line sensor, a circumference corresponding thereto can be inspected.

In the following description, a feature such as a function of correcting the variation is similarly applied to each pixel of the detection signal 123 associated with each position on the surface of the sample 101. The implementation details of the mounting of the sensor 105 are not limited to the line sensor described above, and the sensor 105 may be a charge accumulation type sensor.

[Processing Outline]

The optical foreign matter inspection device 1 according to Embodiment 1 has the following processing outline and sequentially performs processing. The details will be described with reference to FIG. 3 to be described later.

(1) The number-of-pulse calculating circuit 109 calculates, based on the light emission timing synchronizing signal 127, the number of pluses N of the laser 120 in each period TC (FIG. 3) of the stage encoder signal 129 at a timing in the period TC, and outputs the calculated number of pulses N as the number-of-emitted-pulse information 125.

(2) The trigger signal generating circuit 108 generates and outputs, based on the stage encoder signal 129, the trigger signal 124 for determining the timing for the charge accumulation and transfer in the sensor 105 and the timing for the sampling in the detecting circuit 106, and the trigger signal 124 is synchronized with the light emission timing synchronizing signal 127.

(3) The sensor 105 accumulates, in synchronization with the trigger signal 124, the charges from the scattered light 121, and outputs the output signal 122 of a level corresponding to an accumulated-charge amount. The detecting circuit 106 samples, in synchronization with the trigger signal 124, the output signal 122, and obtains and outputs the detection signal 123.

(4) As the signal processing based on the detection signal 123, the luminance correcting circuit 107 performs luminance correction by dividing the luminance value at the pixel at each position by the number of pulses N in the number-of-emitted-pulse information 125 for each circumferential line CL at the position in the radial direction R on the surface of the sample 101. A result of the luminance correction processing is the luminance correction information 128.

Comparative Example—Signals

FIG. 12 illustrates, as an example of the related-art technique, a relation of the signals in an optical foreign matter inspection device according to a comparative example with respect to Embodiment 1. The problems and the like will be supplemented and described with reference to FIG. 12. A graph in FIG. 12 illustrates, from the top, the stage encoder signal shown in (A) of FIG. 12, a light emission timing signal shown in (B) of FIG. 12, a charge transfer trigger signal shown in (C) of FIG. 12 (in other words, a stage synchronization signal), an accumulated-charge amount of a sensor shown in (D) of FIG. 12, and a sensor-output voltage waveform shown in (E) of FIG. 12. In addition, (F) of FIG. 12 shows an example of an output image for the description. A horizontal axis of each graph corresponds to a time axis.

The stage encoder signal shown in (A) of FIG. 12 is, for example, a signal representing the rotation state (the position or the displacement, the rotation angle, and the like) of the rotation stage and the sample, which is generated by and output from an encoder inside the rotation stage. In the stage encoder signal, the period TC for every one pulse 301 is a time corresponding to a unit of a rotation angle or a rotation distance corresponding to a rotation speed (for example, the unit rotation angle $\Delta\theta$) on a circumference corresponding to a position of one pixel as an inspection target (on the circumferential line CL in the circumferential direction C in FIG. 2). The rotation speed is a rotation speed in the circumferential direction of the rotation stage and the sample. In an example, one period TC is about 1 mm in units of rotation distances. In (A) of FIG. 3, examples of the period TC include TC1, TC2, TC3, . . . .

For the light emission timing signal shown in (B) of FIG. 12, a plurality of pulses 302 associated with the pulsed laser are generated. Each pulse 302 defines an emission timing of the pulsed laser. The stage encoder signal shown in (A) of FIG. 12 (that is, the rotation state) and the light emission timing signal shown in (B) of FIG. 12 (that is, a state of the pulse laser) are independent and asynchronous with each other, and as can also be seen from FIG. 12, the pulse 301 and the pulse 302 are not aligned with each other.

The charge transfer trigger signal shown in (C) of FIG. 12 is a signal for controlling the detection in the charge accumulation type sensor, in other words, the accumulation and transfer of the charges, which is synchronized with the stage encoder signal shown in (A) of FIG. 12, and in other words, the stage synchronization signal. One trigger period 330 for one pulse 303 in the charge transfer trigger signal corresponds to a charge transfer period in the charge accumulation type sensor. A time of the charge transfer period is controlled such that the charges are accumulated by the charge accumulation type sensor. The trigger period 330 is a period or a time that has substantially the same length as that of the period TC in (A) of FIG. 12, but a variation may occur during the trigger period 330.

The accumulated-charge amount of the sensor shown in (D) of FIG. 12 indicates an amount of accumulated charges in each pixel in the charge accumulation type sensor. The charge accumulation type sensor accumulates the charges as illustrated in FIG. 12 within one trigger period 330. In response to the charge accumulation, the sensor-output voltage waveform as shown in (E) of FIG. 12 is generated. In one trigger period 330, as illustrated, the accumulated-charge amount increases stepwise from an initial value, and returns to the initial value due to the transfer at an end timing of the trigger period 330 (a timing of the next one pulse 303).

Here, in the comparative example, the light emission timing signal shown in (B) of FIG. 12 and the charge transfer trigger signal shown in (C) of FIG. 12 are asynchronous with each other. More specifically, the charge transfer trigger signal shown in (C) of FIG. 12 is generated to be synchronized with the stage encoder signal shown in (A) of FIG. 12, but since the stage encoder signal shown in (A) of FIG. 12 and the light emission timing signal shown in (B) of FIG. 12 are asynchronous with each other as described above, the light emission timing signal shown in (B) of FIG. 12 and the charge transfer trigger signal shown in (C) of FIG. 12 are also asynchronous with each other. Therefore, a variation in time may occur in each trigger period 330 of the charge transfer trigger signal corresponding to the period TC. In the example, in terms of the number of pulses 302 for the light emission timing signal, the initial period TC1 is roughly 17 as illustrated, and a time corresponding thereto is set to Ty. In terms of the number of pulses 302, the period TC2 is roughly 16, and a time corresponding thereto is set to (Ty−1). In the next period TC3, the number of pulses 302 is 17, and a corresponding time is set to Ty. That is, as in the example, during the period TC and the corresponding trigger period 330, a variation may occur such that the number of pulses N relating to the pulse laser is slightly different. As described above, a main factor for the variation is that the light emission period of the pulse laser and the charge transfer trigger signal are asynchronous with each other. The non-synchronization occurs due to a factor such as a variation in an oscillation frequency, or a non-coherent sample.

Therefore, regarding the accumulated-charge amount of the sensor shown in (D) of FIG. 12, a variation that the accumulated-charge amount increases or decreases within a range of one pulse of the laser at the maximum may occur. In the example shown in (D) of FIG. 12, for example, an accumulated-charge amount 341 reaches, for example, a value c1 in the period TC1, but an accumulated-charge amount 342 reaches, for example, a value c2 in the next period TC2, and the value c2 is slightly smaller ($c2<c1$). The accumulated-charge amount is relatively large in the period TC1, and the accumulated-charge amount is relatively small in the period TC2. That is, a difference 340 in the accumulated-charge amount is generated as a variation between the period TC1 and the period TC2.

The variation of the accumulated-charge amount of the sensor as shown in (D) of FIG. 12 described above is reflected in the sensor-output voltage waveform shown in (E) of FIG. 12. For example, the accumulated-charge amount 341 in the initial period TC1 is transferred in the next period, thus appearing as a waveform 351 corresponding to the time of the period TC2, and the accumulated-charge amount 342 in the next period TC2 appears as a waveform 352 corresponding to the time of the period TC3. The above variation also appears in these waveforms. In the example shown in (E) of FIG. 12, a negative value d2 with respect to a base value of the waveform 352 is smaller than a negative value d1 with respect to the base value of the waveform 351, and a difference 350 therebetween appears as the variation.

Further, (F) of FIG. 12 shows the example of the output image corresponding to the example of the sensor-output voltage waveform shown in (E) of FIG. 12 described above. The output image is a luminance value in each pixel based on the detection signal. Here, for the description, attention is paid to one pixel at one position in the charge accumulation type sensor, and attention is paid to, as inspection target positions, a plurality of positions in time series and in a direction of the rotation angle on the circumferential line associated with the one pixel. In the output image, a value of the sensor-output voltage waveform at each position on the circumferential line (that is, the luminance value in the sampling data) is represented by a color. A direction of a horizontal axis in the output image shown in (F) of FIG. 12 is the direction of the time and the rotation angle, and each square indicates a pixel at each position. Such an output image is similarly present for each pixel at each position in the radial direction.

For example, the waveform 351 in the period TC2 appears as a luminance value of the pixel at the position P1 in the output image, and the waveform 352 in the period TC3 appears as a luminance value of the pixel at the position P2 in the output image. Here, the luminance value of the pixel at the position P1 is represented by a white rectangle as a first luminance value, and the luminance value of the pixel at the position P2 is represented by a gray rectangle (a dot pattern in FIG. 12) as a second luminance value. The second luminance value is smaller than the first luminance value and has a darker color. In the example, on the circumferential line of the output image, the second luminance value appears occasionally mixed with the first luminance value.

Even in a case where the sample as the inspection target is normal and beams having the same light amount are incident on the positions on the sample surface from the laser light source, as described above, a variation in detection signal values (the corresponding luminance values of the pixels) may occur among the respective positions.

The optical foreign matter inspection device performs, based on such detection signal values, the measurement of the luminance at each position on the sample surface, the foreign matter determination, the generation and display of the mapping image, and the like. The foreign matter determination is performed according to a predetermined foreign matter determination method, for example, a method of determining the presence or absence of a foreign matter by comparing the luminance value of the pixel at each position with a predetermined threshold value. The mapping image is an image obtained by mapping information on a position of the determined and detected foreign matter or the like in an image associated with the sample surface. Therefore, in the optical foreign matter inspection device, a difference in the detection signal value may appear as erroneous detection or image quality deterioration due to the variation described above. A luminance difference generated between the pixels at the positions may appear as a decrease in the measurement and inspection accuracy or a decrease in the image display quality.

Examples of a numerical value relating to the variation are provided below. A period of the light emission timing signal shown in (B) of FIG. 12 is set to Tx, and a period of the charge transfer trigger signal shown in (C) of FIG. 12 is set to Ty. In this case, the accumulated-charge amount of the sensor shown in (D) of FIG. 12 has a range of $Ty/Tx \pm 1$ as in the illustrated example. As a specific example, when Tx=10 μs and Ty=100 μs, the accumulated-charge amount is an accumulated-charge amount of 10±1 pulses. That is, a variation of 10% at the maximum occurs.

The optical foreign matter inspection device 1 according to Embodiment 1 has a function of correcting the luminance of the pixel at each position in consideration of the variation described above. As a result, the optical foreign matter inspection device 1 according to Embodiment 1 can reduce or eliminate the variation in the detection signal value, and the high-accuracy detection signal value, foreign matter determination result information, or the like can be obtained.

Embodiments—Signals

FIG. 3 illustrates examples of the signals in the optical foreign matter inspection device 1 according to Embodiment 1. (A) of FIG. 3 shows the stage encoder signal 129, (B) of FIG. 3 shows the light emission timing synchronizing signal 127 synchronized with the light emission timing signal 126, (C) of FIG. 3 shows the trigger signal 124 corresponding to the charge transfer trigger signal in the comparative example, (D) of FIG. 3 shows the accumulated-charge amount of the sensor 105, (E) of FIG. 3 shows the voltage waveform of the output signal 122 of the sensor 105, and (F) of FIG. 3 shows an example of the output image.

As in the comparative example, the stage encoder signal 129 shown in (A) of FIG. 3 has the period TC for each pulse 401 corresponding to the unit rotation angle Δθ on the circumferential line CL in FIG. 2, and a time thereof is set to Tx.

The light emission timing synchronizing signal 127 shown in (B) of FIG. 3 is similar to the light emission timing signal in the comparative example, and the light emission timing synchronizing signal 127 has a plurality of pulses 402 corresponding to a light emission period of the pulsed laser 120. For example, the number of the pulses 402 (that is, the number of pulses N) is 17 in the period TC1, 17 in the period TC2, and 16 in the period TC3.

The trigger signal 124 shown in (D) of FIG. 3 is generated, based on the stage encoder signal 129 shown in (A) of FIG. 3 (the corresponding rotation state), by the trigger signal generating circuit 108 to be synchronized with the light emission timing synchronizing signal 127 shown in (B) of FIG. 3 (the corresponding state of the pulse laser). That is, a pulse 403 in the trigger signal 124 is generated to be aligned in timing with the pulse 402 of the light emission timing synchronizing signal 127. The trigger signal 124 has a trigger period 430 for each pulse 403. Due to the difference in the number of the pulses 402 of the light emission timing synchronizing signal 127, a variation occurs in the trigger period 430.

The accumulated-charge amount of the sensor shown in (D) of FIG. 3 is an amount of the charges to be accumulated and transferred by the sensor 105 in the trigger period 430 synchronized with the trigger signal 124. For example, the accumulated-charge amount in the trigger period 430 corresponding to the period TC1 or the period TC2 corresponds to 17 pulses 402 (the time Tx), and is a value C1 at an end timing of the trigger period 430. The accumulated-charge amount in the trigger period 430 corresponding to the period TC3 corresponds to 16 pulses 402 (the time Tx−1), and is a value C2 at the end timing of the trigger period 430. C1>C2.

In the period TC1 and the period TC2, the accumulated-charge amount is relatively large, and in the period TC3, the accumulated-charge amount is relatively small. Accordingly, a difference 440 between the value C1 and the value C2 is generated as a variation in these trigger periods 430.

For example, in each of waveforms 451, 452 respectively corresponding to accumulated-charge amounts 441, 442 corresponding to the trigger periods 430 in the periods TC1, TC2, the sensor-output voltage waveform shown in (E) of FIG. 3 has a negative value D1 with respect to a base value, and in a waveform 453 corresponding to an accumulated-charge amount 443 corresponding to the period 430 in the period TC3, the sensor-output voltage waveform shown in (E) of FIG. 3 has a negative value D2 with respect to the base value. A difference 450 between these values is generated as a variation.

In Embodiment 1, since the configuration of the circuit or the like is different from that of the comparative example, the variation (the difference 440 and the difference 450) is smaller than a degree of the variation in the comparative example. As a specific example, the variation (the difference 440 and the difference 450) is 5.9% (=1/16).

In the output image shown in (F) of FIG. 3, images before and after the correction performed by the luminance correcting circuit 107 are shown as examples. A current image 461 before the correction includes, for example, luminance values of three pixels (the positions P1 to P3) that correspond to the three waveforms 451 to 453 shown in (E) of FIG. 3 corresponding to the three positions in the periods TC1 to TC3. The first luminance value (white) is shown at the positions P1, P2, and the second luminance value (gray) lower than the first luminance value is shown at the position P3. That is, the variation in the luminance value occurs before the correction. In an image 462 after the correction, the first luminance value (white) is shown for all the pixels at the positions P1, P2, and P3. That is, after the correction, the variation in the luminance value is eliminated.

[Inspection Modes]

The optical foreign matter inspection device 1 according to Embodiment 1 has at least three modes below as the inspection modes. The function of correcting the variation described above can be similarly applied in any of the modes. The overall control unit 112 controls the application and switching of the inspection modes based on an instruction or a setting.

The first mode is a constant angular velocity mode. The first mode is a mode in which the inspection is performed while a rotation angular velocity of the wafer serving as the sample 101, that is, a rotation angular velocity of the rotation stage 102 is maintained constant. In the case of the first mode, a linear velocity differs depending on the position of the pixel of the sensor 105 that is a line sensor, in other words, the circumferential line CL at each position in the radial direction R. For example, the number of pulses in each period is different between a circumferential line CL close to an outer periphery and a circumferential line CL close to an inner periphery.

A second mode is a constant linear velocity mode. The second mode is a mode in which the wafer serving as the sample 101 on the rotation stage 102 is rotated and inspected such that a linear velocity at the position of each pixel of the sensor 105, in other words, on the circumference at each position in the radial direction R is maintained constant. In the second mode, the overall control unit 112 performs control so as to change the angular velocity according to the position of each pixel of the sensor 105, for example, on the circumferential line CL close to the outer periphery and the circumferential line CL close to the inner periphery, and makes the linear velocity of each circumference constant. In the case of this mode, for example, the number of pulses in each period can be substantially the same (note that there is still the problem of the variation described above) on the circumferential line close to the outer periphery and the circumferential line close to the inner periphery.

A third mode is an acceleration and deceleration mode. The third mode is an inspection mode in which the inspection is started before the linear velocity on the circumference at each position in the radial direction R becomes constant, and the linear velocity is decelerated before the inspection ends. In the third mode, the number of pulses in each period is different during the acceleration and deceleration of the linear velocity, and the number of pulses is substantially the same in a period in which the linear velocity is constant.

FIG. 4 is a diagram illustrating the first mode, the second mode, and the third mode as the inspection modes. Here, as the circumference that is an inspection target, a circumferential line CL1 at the position p1 close to the outer periphery and a circumferential line CLm at the position pm close to the inner periphery in (B) of FIG. 2 described above will be described as examples. (A) of FIG. 4 illustrates a coordinate system on an upper surface of the wafer serving as the sample 101 for the description. As a position coordinate (r) in the radial direction R that is associated with the position of the pixel of the sensor 105 that is a line sensor, the central point of the circular shape is set to 0, and the outer periphery is set to X. The pixel of the sensor 105 is associated with the position coordinate r on an axis in the radial direction R, and can be set, for example, in a range from 0 to X. A circumferential line CLr corresponding to the position coordinate r in the illustrated example is an inspection target. Circumferences at other positions can also be similarly set as the inspection target. On the circumferential line CLr as the inspection target, the angular velocity in the circumferential direction C (the corresponding rotation angle θ) is set to ω [rad/s], and the linear velocity is set to v [m/s].

A graph in (B) of FIG. 4 shows a relation between a sensor pixel position (r) in the radial direction R and the angular velocity ω in each mode of the first mode, the second mode, and the third mode. A graph in (C) of FIG. 4 shows a relation between the sensor position (r) in the radial direction R and the linear velocity v in each mode of the first mode, the second mode, and the third mode. The first mode M1 is shown by a solid line, the second mode M2 is shown by a broken line, and the third mode M3 is shown by a dotted line. As shown in (B) of FIG. 4, in the first mode M1, the angular velocity ω is constant regardless of the position (r) in the radial direction R, and in the second mode M2, the angular velocity ω linearly increases as the position (r) in the radial direction R becomes large (that is, as approaching the outer periphery). In the third mode M3, the angular velocity ω linearly increases in an inspection region other than the inspection region close to the inner periphery and the inspection region close to the outer periphery, and the angular velocity A nonlinearly changes in the inspection region close to the inner periphery and the inspection region close to the outer periphery. As shown in (C) of FIG. 4, in the second mode M2, the linear velocity v is constant regardless of the position (r) in the radial direction R, and in the first mode M1, the angular velocity ω linearly increases as the position (r) in the radial direction R becomes large (that is, as approaching the outer periphery). In the third mode M3, the linear velocity v is constant in an inspection region other than the inspection region close to the inner periphery and the inspection region close to the outer periphery, and the linear velocity v is accelerated or decelerated in other inspection regions.

[Luminance Correction]

In Embodiment 1, as an example of the luminance correction processing for the detection signal 123 performed by the luminance correcting circuit 107, as described above, a method of performing division by using the number of pulses N related to the laser 120 is used. In the method, a sampling signal value of the detection signal 123 is divided by the number of pulses N in the corresponding period (the trigger period 430 in FIG. 3) for each unit of the rotation angle θ or the rotation distance on the circumferential line CL on the surface of the sample 101. Accordingly, regarding the luminance correction information 128 that is a signal after the division, as illustrated by the output image shown by (F) of FIG. 3, an effect of eliminating or reducing the variation in the luminance between the pixels at the positions can be obtained. The optical foreign matter inspection device 1 can output a high-accuracy measurement result based on such luminance correction information 128 (a signal value after the correction), and can perform a high-accuracy foreign matter determination by the foreign matter determining circuit 130.

Further, the value in the luminance correction information 128 becomes smaller due to the division with respect to the original luminance value. Therefore, in a case where the optical foreign matter inspection device 1 displays the measurement result or the inspection result, for example, the luminance correction information 128 may be data obtained by increasing the value by multiplying the signal value after the division by a constant value, or the like.

[Effects and the Like (1)]

As described above, according to the optical foreign matter inspection device 1 of Embodiment 1, it is possible to reduce or eliminate the variation between the detection signals at positions on the surface of the sample 101, which may occur due to the non-synchronization between the charge transfer trigger signal and the light emission timing signal in the related art, and it is possible to achieve the high-accuracy inspection or the like. In particular, according to Embodiment 1, in the optical foreign matter inspection device 1 that has a combination of the laser light source 104, which is a pulse laser, and the sensor 105, which is a charge accumulation type sensor, and performs the rotation inspection on the sample 101 on the rotation stage 102, the variation can be reduced or eliminated. That is, in the optical foreign matter inspection device 1, it is possible to reduce or eliminate the variation in the luminance value between the pixels associated with the positions on the circumferential lines CL at the corresponding positions in the radial direction R on the surface of the sample 101, in the detection signal 123.

In the optical foreign matter inspection device, the variation in the luminance value between the pixels in the detection signal described above is a factor that limits a foreign matter detection performance. According to the optical foreign matter inspection device 1 of Embodiment 1, at the time of the rotation inspection, it is possible to eliminate or significantly reduce the unnecessary luminance difference (the variation described above) that corresponds to the difference between the positions in the radial direction R on the surface of the sample 101 and may occur between the pixels at the positions on the circumferential lines CL which are scanning lines. Accordingly, it is possible to improve the accuracy of the measurement and the inspection on the semiconductor wafer or the like, and it is possible to obtain effects such as high accuracy of process monitoring using the optical foreign matter inspection device and improvement in yield achieved thereby.

Embodiment 2

An optical foreign matter inspection device according to Embodiment 2 will be described with reference to FIG. 5 and subsequent figures. A basic configuration of Embodiment 2 and the like is similar to that of Embodiment 1, and hereinafter, configuration portions in Embodiment 2 different from those in Embodiment 1 and the like will be described. In Embodiment 2, a component and a function are added with respect to Embodiment 1. In Embodiment 2, a function of adjusting the threshold value for the foreign matter determination is provided in consideration of a difference in the circumferential line at the position in the radial direction on the sample surface. The function according to Embodiment 2 is provided for the first mode described above.

In the case of the rotation inspection in the first mode M1 (the constant angular velocity mode) as in FIG. 4 described above, the linear velocity v is different between an inner periphery side and an outer periphery side of the wafer serving as the sample 101. Therefore, the number of pulses N for one pixel at one position varies depending on the inspection mode and the position (the position coordinate r) in the radial direction R. With respect to the number of pulses N, a signal level is proportional to N, a noise level is proportional to $\sqrt{N}$, and the signal-to-noise ratio (S/N) is proportional to $\sqrt{N}$. Therefore, the S/N is lower on the outer periphery side as compared with that on the inner periphery side of the wafer, which is not desirable.

[S/N in the First Mode]

FIG. 5 illustrates an outline image of the S/N in the first mode. In FIG. 5, it is shown that on the X-Y plane of the sample 101, regarding the position (r) in the radial direction R, the S/N is lower on the outer periphery side than that on the inner periphery side. In a case where the positions in the radial direction R are different, even when the rotation stage 102 is at the same rotation speed, an interval and a density at which the laser 120 is emitted to each position on the circumferential line are different, and the energy of the laser 120 emitted to each position also differs. For example, on a circumferential line CLrout at, for example, a position rout on the outer periphery side and a circumferential line CLrin at, for example, a position rin on the inner periphery side illustrated in FIG. 5, the linear velocity v on the outer periphery side is larger (in other words, faster) than that on the inner periphery side. On the circumferential line CLrin on the inner periphery side, the number of pulses N in each period described above (the trigger period 430 in FIG. 3) is relatively large, so that the signal level is relatively high. On the other hand, on the circumferential line CLrout on the outer periphery side, the number of pulses N in each period is relatively small, so that the signal level is relatively low.

Therefore, in a case of applying a method of using the same foreign matter determination threshold value as the foreign matter determination method in the related art with respect to the differences in the position and the circumference in the radial direction R, there is a concern that erroneous determination such as oversight of foreign matter or a false defect is more likely to occur at the position on the outer periphery side as compared with the position on the inner periphery side. Therefore, Embodiment 2 has the following configuration as a devise relating to the problems described above. The optical foreign matter inspection device according to Embodiment 2 calculates, based on the number of pulses N in each period described above, a suitable foreign matter determination threshold value matching the period, and determines the presence or absence of a foreign matter based on the data of the detection signal subjected to the luminance correction performed according to the method in Embodiment 1 described above and the foreign matter determination threshold value.

[Optical Foreign Matter Inspection Device (2)]

FIG. 6 illustrates a configuration of the optical foreign matter inspection device 1 according to Embodiment 2. The configuration mainly differs from the configuration according to Embodiment 1 in FIG. 1 in that the processing system 180 includes a threshold value calculating circuit 141. The threshold value calculating circuit 141 receives the detection signal 123 from the detecting circuit 106 and the number-of-emitted-pulse information 125 from the number-of-emitted-pulse calculating circuit 109, and calculates, based on the number of pulses N, a suitable foreign matter determination threshold value (referred to as a threshold value H) to be applied to the foreign matter determining circuit 130. The threshold value calculating circuit 141 calculates the threshold value H based on the number of pulses N in each period (the trigger period 430 in FIG. 3) associated with the pixel at each position in the detection signal 123, and provides threshold value information 142 including the threshold value H to the foreign matter determining circuit 130.

The foreign matter determining circuit 130 receives the luminance correction information 128, which is the image data subjected to the luminance correction performed by the luminance correcting circuit 107 according to the method of Embodiment 1 described above, and the threshold value information 142 from the threshold value calculating circuit 141. The foreign matter determining circuit 130 compares the luminance value of the pixel at each position after the luminance correction with the threshold value H associated with the position or the period to determine the presence or absence of a foreign matter, and stores and outputs the foreign matter determination result information 131. For example, when a value of a pixel at the target position exceeds the threshold value H, the foreign matter determining circuit 130 determines that there is a foreign matter.

The processing system 180 or the overall control unit 122 uses the foreign matter determination result information 131 to visualize the foreign matter determination result in a form of a mapping image on the display screen of the display device together with the GUI. The user U1 can confirm the foreign matter determination result by viewing the mapping image.

Example of Foreign Matter Determination

FIG. 7 is a diagram illustrating an example of the foreign matter determination using the threshold value H in Embodiment 2. In a graph of FIG. 7, a horizontal axis represents the position of the pixel of the sensor 105 corresponding to the position (the position coordinate r) in the radial direction R on the surface of the sample 101, and a vertical axis represents a signal intensity. The signal intensity is, in other words, a signal level at the S/N, and is a value corresponding to the light intensity of the scattered light 121 or the luminance value of each pixel in the detection signal 123. A straight line 701 indicated by a solid line is a function of a signal intensity of a desired foreign matter in the first mode (the constant angular velocity mode), and is a linear function in which the signal intensity linearly decreases as the position in the radial direction R increases. The desired foreign matter is, in other words, a foreign matter desired to be detected in the inspection, and corresponds to a foreign matter model or the like having a predetermined physical property. Such a function can be grasped and set by actually measuring the desired foreign matter by an experiment in advance, for example. A straight line 702 indicated by a broken line is a setting example of a function of the threshold value H that is the foreign matter determination threshold value, and is a linear function that has a slope similar to that of the straight line 701 and in which the signal intensity linearly decreases as the position in the radial direction R increases. In the example, the straight line 702 for the threshold value H is set with a predetermined difference 703 with respect to the straight line 701 for the signal intensity of the desired foreign matter. As described above, the foreign matter determination threshold value is set as a suitable value that varies depending on the position in the radial direction R.

As illustrated in FIG. 5 described above, in the first mode (the constant angular velocity mode), as the position coordinate r in the radial direction R on the surface of the sample 101 increases, the linear velocity v on the circumferential line CL increases. Therefore, as the position coordinate r in the radial direction R increases, a light amount of the incident light (the scattered light 121 described above) on the corresponding pixel of the sensor 105 relatively decreases. Therefore, in the first mode according to Embodiment 2, the foreign matter determination threshold value, which changes depending on the position of the pixel of the sensor 105 corresponding to the position in the radial direction R, is adjusted and varies according to the signal intensity of the desired foreign matter or the S/N. Accordingly, in the foreign matter determination processing to which the adjusted threshold value H is applied, it is possible to detect the desired foreign matter with high accuracy. For an object having a physical property different from that of the desired foreign matter on the surface of the sample 101, the erroneous detection can be prevented.

The function of the threshold value H described above is not limited to the linear function, and may be a curved line, a stepwise function, or the like. In addition, the number of threshold values is not limited to one for each position, and a plurality of threshold values may be provided for each position. For example, a plurality of ranges may be defined for each position by using a plurality of threshold values, and the determination on the presence or absence of a foreign matter, a degree of probability of a foreign matter, or the like for one or more desired foreign matters may be performed by using the plurality of ranges.

[Effects and the Like (2)]

As described above, according to Embodiment 2, it is possible to perform the foreign matter determination with high accuracy in addition to the effects according to Embodiment 1. According to Embodiment 2, the foreign matter determination threshold value is adjusted to a suitable foreign matter determination threshold value according to the signal intensity or the S/N estimated based on the number of pulses N and depending on the difference in the position in the radial direction on the sample surface relating to the rotation inspection. Accordingly, the suitable foreign matter determination can be performed in accordance with the inspection mode and the difference in the position in the radial direction, the erroneous detection can be prevented, and the high-accuracy determination result can be obtained. For example, in the first mode, the erroneous detection such as a false defect can be reduced even on the circumferential line at the position on the outer periphery side in the radial direction at which the S/N tends to be relatively low. Further, in Embodiment 2, the same can also be similarly applied in the third mode (the acceleration and deceleration mode).

In the calculation of the threshold value H described above, the threshold value calculating circuit 141 may calculate the S/N or the like for each position in the radial direction R based on the concept as illustrated in FIG. 5, and determine the corresponding threshold value H according to a value of the S/N or the like. Alternatively, the threshold value calculating circuit 141 may set the reference threshold value H in advance, and correct the threshold value H for each position in the radial direction R (for example, multiply a correction coefficient or the like) to determine the corrected threshold value H. The function (the straight line 702) of the threshold value H as illustrated in FIG. 7 may be in a form of being calculated in real time each time the inspection is performed, or may be in a form in which a lookup table of a content corresponding to the function is created and held in advance, and the calculation is omitted by referring to the table and performing the inputting and outputting at the time of the inspection.

Embodiment 3

An optical foreign matter inspection device according to Embodiment 3 will be described with reference to FIG. 8 and subsequent figures. In Embodiment 3, components and a function are added with respect to Embodiment 1. In Embodiment 3, a function of correcting a position coordinate deviation corresponding to a time difference between the stage encoder signal 129 and the trigger signal 124 is provided.

The time difference may occur between the period TC for one pulse 401 of the stage encoder signal 129 shown in (A) of FIG. 3 and the trigger period 430 for one pulse 403 of the trigger signal 124 shown in (C) of FIG. 3. The time difference may occur as a slight position coordinate deviation. The position coordinate deviation can be calculated by converting the time difference. In other words, the position coordinate deviation is a deviation in the rotation angle or the rotation distance on the circumferential line on the sample surface. When the trigger signal 124 is generated to be synchronized with the light emission timing synchronizing signal 12 as illustrated in FIG. 1, a deviation (in other words, a signal delay) may occur in a timing for the sampling in the detecting circuit 106 with respect to the stage encoder signal 129. Therefore, due to the deviation, for example, a position coordinate deviation of about 2% at the maximum may occur.

[Position Coordinate Deviation]

FIG. 8 is a diagram illustrating an example of the occurrence of the position coordinate deviation due to the time difference between the stage encoder signal 129 shown in (A) of FIG. 8 and the trigger signal 124 shown in (C) of FIG. 8 in Embodiment 3. Portions for the periods TC1, TC2 of the stage encoder signal 129 are shown. In the period TC1, a pulse 3011 is at the same timing as a pulse 3031 of the trigger signal 124. However, in the next period TC2, a time difference 801 occurs between a pulse 3012 of the stage encoder signal 129 and a pulse 3032 of the trigger signal 124. In the detection signal 123, the time difference 801 appears as a deviation in the rotation angle θ or the rotation distance on the circumferential line CL on the surface of the sample 101, that is, as the position coordinate deviation.

A delay occurs when the stage encoder signal 129 from the rotation stage 102 in FIG. 1 is transmitted via a circuit, a signal line, or the like. When the stage encoder signal 129 is input to, for example, the trigger signal generating circuit 108 in FIG. 1, a predetermined delay occurs. Such a delay or the like is a factor for the deviation in the timing described above. Even in a case where the detections in the sensor 105 and the detecting circuit 106 are controlled at the timing of the trigger signal 124 that is based on the light emission timing synchronizing signal 127, when a deviation occurs between the timing for these detections and the timing for the stage encoding signal 129, the deviation may appear as the position coordinate deviation in the detection result.

Therefore, in Embodiment 3, a circuit for detecting the position coordinate deviation (the corresponding time difference) between the stage encoder signal 129 and the trigger signal 124, and a circuit for correcting the position coordinate on the sample surface by using the detected position coordinate deviation are provided.

[Optical Foreign Matter Inspection Device]

FIG. 9 illustrates a configuration of the optical foreign matter inspection device 1 according to Embodiment 3. The configuration mainly differs from the configuration according to Embodiment 1 in FIG. 1 in that a position deviation calculating circuit 191 and a position correcting circuit 192 are additionally provided in the processing system 180. The position deviation calculating circuit 191 is provided in parallel with the trigger signal generating circuit 108.

The position deviation calculating circuit 191 receives the stage encoder signal 129 as shown in (A) of FIG. 8 and the trigger signal 124 as shown in (C) of FIG. 8, and calculates the position coordinate deviation based on the time difference therebetween (for example, the time difference between the pulses in FIG. 8). Then, the position deviation calculating circuit 191 provides position deviation information 193 indicating the calculated position coordinate deviation to the position correcting circuit 192.

The position correcting circuit 192 corrects each position coordinate in the coordinate system (FIG. 2 and the like) on the surface of the sample 101 by using the received position deviation information 193 to eliminate the deviation, and provides position coordinate information 194 after the correction to the foreign matter determining circuit 130.

The foreign matter determining circuit 130 receives the position coordinate information 194 after the correction and the luminance correction information 128 after the luminance correction from the luminance correcting circuit 107, and performs the foreign matter determination by using the luminance value indicated by the luminance correction information 128 at the corrected position coordinate indicated by the position coordinate information 194. As described above, as the method for the foreign matter determination, a method of determining the presence or absence of a foreign matter by comparing the luminance value with the threshold value can be applied. The foreign matter determining circuit 130 stores and outputs the foreign matter determination result information 131. As described above, the processing system 180 or the overall control unit 112 displays the foreign matter determination result information 131 in a form of a mapping image or the like.

Further, in Embodiment 3, the method of adjusting the foreign matter determination threshold value in Embodiment 2 may also be similarly applied.

[Effects and the Like (3)]

As described above, according to Embodiment 3, it is possible to perform the foreign matter determination with high accuracy in addition to the effects according to Embodiment 1. According to Embodiment 3, the position coordinate deviation corresponding to the time difference between the stage encoder signal 129 and the trigger signal 124 is corrected in the rotation inspection, and thus a luminance value, for which the variation is eliminated, at a more accurate position coordinate is obtained. Accordingly, a position reproducibility at the time of the foreign matter determination can be improved by using the corrected information, and the high-accuracy inspection can be performed.

[Modification]

The following is also possible as a modification of Embodiment 3. FIG. 10 illustrates parts of the processing system 180 in a configuration of the modification. The configuration has the following differences from the configuration in FIG. 9. The position correcting circuit 192 receives the position deviation information 193 from the position deviation calculating circuit 191 and the luminance correction information 128 from the luminance correcting circuit 107, corrects the position coordinate information included in the luminance correction information 128 after the correction to eliminate the deviation by using the position deviation information 193, and provides information 195 after the correction to the foreign matter determining circuit 130. In such an embodiment, the same effects as those according to Embodiment 3 can also be obtained.

[Mapping Image]

FIG. 11 illustrates a screen example in which information such as the mapping image of the foreign matter inspection result is displayed together with the GUI, and which is applicable in each embodiment described above. In FIG. 11, the screen example corresponding to the function according to Embodiment 1 (the function of correcting the variation in the luminance of the pixel at each position on the sample surface) is illustrated.

Since the foreign matter determination result information 131 in FIG. 1 and the like includes the value of each pixel at each position on the surface of the sample 101, it is possible to generate the mapping image. In the mapping image, the position coordinate of the detected foreign matter in the coordinate system on the surface of the sample 101 is visualized. For example, the position coordinate of the foreign matter in a case where it is determined and detected that there is a foreign matter on the circumferential line CL (FIG. 2) as the inspection target is graphically displayed together with an image such as a point and foreign matter information associated therewith. The processing system 180 or the overall control unit 112 may automatically display the mapping image after the correction based on the setting or the instruction performed by the user U1 using the GUI. Alternatively, displaying of the mapping image before the correction and displaying of the mapping image after the correction may be switched according to an operation, and the mapping images before and after the correction may be displayed in parallel in the screen.

In the screen example in FIG. 11, the mapping images before and after the correction are displayed in parallel together with the GUI. In the example, target sample information, the inspection information (for example, the inspection mode, the rotation speed, and the like as inspection types), setting information on validity/invalidity of the luminance value variation correction function, and the like are displayed in the screen, and the user U1 can confirm and set the above. Further, the mapping image before the correction is displayed in a region 1101, and the mapping image after the correction is displayed in a region 1102. In each mapping image, the position determined and detected as the foreign matter on the surface of the sample 101 is visualized, and the position coordinate, the rotation angle, and other information are displayed as the foreign matter information.

In an example of the mapping image before the correction, there are two foreign matters at positions LA1, LA2. Meanwhile, in an example of the mapping image after the correction, there is only one foreign matter at the position LA1. Regarding the position LA2, as a result of the correction for the luminance value of the position, it is determined that there is no foreign matter in the foreign matter determination. In particular, when the luminance value in each period, each position, and each pixel is close to the foreign matter determination threshold value, the determination result on the presence or absence of a foreign matter is likely to fluctuate, but the accuracy of the foreign matter determination can be improved by the luminance correction in the embodiments.

Although the invention has been described in detail based on the embodiments, the invention is not limited to the embodiments described above and can be variously modified without departing from the scope. Unless otherwise specified, each component may be singular or plural. It is also possible to adopt a combination of the embodiments. Except for essential components, the components of the embodiments may be added, deleted, replaced or the like. The invention is not limited to the example of an inspection device for a semiconductor wafer, and can be applied to devices and systems that perform similar measurement, observation, inspection, evaluation, and the like.

REFERENCE SIGNS LIST

1 optical foreign matter inspection device
101 sample (wafer)
102 rotation stage
103 translation stage
104 laser light source (pulse laser)
105 sensor
106 detecting circuit
107 luminance correcting circuit
108 trigger signal generating circuit
109 number-of-emitted-pulse calculating circuit
110 stage control unit
112 overall control unit
120 laser
121 scattered light
121 scattered light
122 output signal
123 detection signal
124 trigger signal
125 number-of-emitted-pulse information
126 light emission timing signal
127 light emission timing synchronizing signal
128 luminance correction information
129 stage encoder signal (first signal)
130 foreign matter determining circuit
131 foreign matter determination result information
150 stage
160 irradiation optical system
170 detection optical system
180 processing system
U1 user

The invention claimed is:

1. An optical foreign matter inspection device for inspecting a foreign matter on a surface of a sample, comprising:

a rotation stage allowing the sample to be placed thereon and configured to be rotationally driven, the rotation stage generating a first signal indicating or capable of specifying a rotation state of the sample on the rotation stage, the first signal being a pulse signal generated according to at least a rotation speed and a rotation angle of the rotation stage;

a laser light source configured to irradiate the surface of the sample with a pulsed laser;

a charge accumulation type sensor configured to detect light scattered or reflected from the surface of the sample;

a detecting circuit configured to perform analog-digital conversion on and detect an output signal of the charge accumulation type sensor;

a light emission timing signal generating circuit configured to generate a light emission timing synchronizing signal that is synchronized with a light emission timing signal for the pulsed laser of the laser light source;

a trigger signal generating circuit configured to receive the light emission timing synchronizing signal and the first signal, generate a trigger signal for controlling a timing for charge accumulation in the charge accumulation type sensor and a timing for detection in the detecting circuit, the trigger signal being synchronized with the light emission timing synchronizing signal, and provide the trigger signal to the charge accumulation type sensor and the detecting circuit;

a number-of-emitted-pulse calculating circuit configured to receive the light emission timing synchronizing signal and the first signal, and based on the light emission timing synchronizing signal and the first signal, calculate a number of pulses of the pulsed laser in each period, of a plurality of periods, of the first signal, based on the light emission timing synchronizing signal, at each pixel at a plurality of positions simultaneously, which are at a set of predetermined distances in a radial direction with respect to a center of the sample, along a circumferential line on the sample; and a processing system configured to measure a state of each position, associated with the rotation, on the circumferential line on the surface of the sample by using the detection signal and the number of pulses.

2. The optical foreign matter inspection device according to claim 1, further comprising:

a luminance correcting circuit configured to receive the detection signal and the number of pulses, and correct a luminance value of each pixel at each position on the circumferential line of the sample, the luminance value corresponding to the position in the radial direction of the sample and the pixel of the sensor, so as to eliminate a variation in the luminance value.

3. The optical foreign matter inspection device according to claim 2, further comprising:

a foreign matter determining circuit configured to determine the presence or absence of a foreign matter at each position on the surface of the sample by using luminance correction information after the correction of the luminance value.

4. The optical foreign matter inspection device according to claim 3, further comprising:

a threshold value calculating circuit configured to receive the detection signal and the number of pulses, and calculate a threshold value for foreign matter determination, the threshold value corresponding to a circumferential line at a position in the radial direction on the surface of the sample, wherein the foreign matter determining circuit determines the presence or absence of a foreign matter at each position on the surface of the sample by using the luminance correction information and the threshold value corresponding to the circumferential line.

5. The optical foreign matter inspection device according to claim 4, wherein the optical foreign matter inspection device has a first mode as a mode in which the sample is inspected while the rotation stage is being rotated, wherein the first mode is a mode in which an angular velocity is maintained constant regardless of a difference in the circumferential line at a position in the radial direction on the surface of the sample, and wherein in a case of an inspection in the first mode, the threshold value calculating circuit calculates the threshold value according to a property of a signal intensity or a signal-to-noise ratio, the property depending on the difference in the circumferential line at a position in the radial direction on the surface of the sample.

6. The optical foreign matter inspection device according to claim 2, further comprising:

a position deviation calculating circuit configured to receive the first signal and the trigger signal, and calculate a position coordinate deviation corresponding to a time difference between the first signal and the trigger signal; and a position correcting circuit configured to correct a position coordinate on the surface of the sample based on the position coordinate deviation, wherein the luminance correcting circuit corrects the luminance value based on the position coordinate after the correction in the position correcting circuit.

7. The optical foreign matter inspection device according to claim 6, further comprising:

a foreign matter determining circuit configured to determine the presence or absence of a foreign matter at each position on the surface of the sample by using luminance correction information after the correction of the luminance value.

8. The optical foreign matter inspection device according to claim 4, wherein the optical foreign matter inspection device has an acceleration and deceleration mode as a mode in which the sample is inspected while the rotation stage is being rotated, wherein the acceleration and deceleration mode is a mode in which a linear velocity varies in an inspection region close to an inner periphery and an inspection region close to an outer periphery, and the linear velocity is constant in an inspection region other than the inspection region close to the inner periphery and the inspection region close to the outer periphery, and wherein in a case of an inspection in the acceleration and deceleration mode, the threshold value calculating circuit calculates the threshold value according to a property of a signal intensity or a signal-to-noise ratio, the property depending on a difference in the circumferential line at a position in the radial direction on the surface of the sample.

* * * * *